United States Patent
Suzuki et al.

(10) Patent No.: US 10,068,532 B2
(45) Date of Patent: Sep. 4, 2018

(54) DISPLAY DEVICE INCLUDING SIGNAL PROCESSOR THAT SUPERIMPOSES VISIBLE LIGHT COMMUNICATION SIGNALS ON BACKLIGHT CONTROL SIGNALS GENERATED BASED ON AN IMAGE SIGNAL

(71) Applicant: Panasonic Corporation, Osaka (JP)

(72) Inventors: Takashi Suzuki, Osaka (JP); Toshiyuki Maeda, Kanagawa (JP); Akihiro Ueki, Kanagawa (JP); Akira Shiokawa, Osaka (JP); Koji Aoto, Hyogo (JP); Koji Nakanishi, Kanagawa (JP); Hideki Aoyama, Osaka (JP); Mitsuaki Oshima, Kyoto (JP)

(73) Assignee: PANASONIC CORPORATION, Osaka (JP)

( * ) Notice: Subject to any disclaimer, the term of this patent is extended or adjusted under 35 U.S.C. 154(b) by 56 days.

(21) Appl. No.: 15/054,573

(22) Filed: Feb. 26, 2016

(65) Prior Publication Data
US 2016/0180779 A1 Jun. 23, 2016

Related U.S. Application Data
(63) Continuation of application No. PCT/JP2014/003999, filed on Jul. 30, 2014.

(30) Foreign Application Priority Data
Oct. 25, 2013 (JP) .................................. 2013-221934

(51) Int. Cl.
G09G 3/34 (2006.01)
H04B 10/116 (2013.01)

(52) U.S. Cl.
CPC ........... *G09G 3/3406* (2013.01); *G09G 3/342* (2013.01); *H04B 10/116* (2013.01);
(Continued)

(58) Field of Classification Search
CPC ......... G09G 2310/024; G09G 2310/08; G09G 2320/062; G09G 2320/064;
(Continued)

(56) References Cited

U.S. PATENT DOCUMENTS 7,570,246 B2 8/2009 Maniam et al.
7,830,357 B2 11/2010 Kitaoka et al.
(Continued)

FOREIGN PATENT DOCUMENTS

JP 2007-043706 2/2007
JP 2007-096547 4/2007
(Continued)

OTHER PUBLICATIONS

Extended European Search Report dated Sep. 12, 2016 in corresponding European Application No. 14855722.6.
(Continued)

*Primary Examiner* — Ram A Mistry
(74) *Attorney, Agent, or Firm* — Wenderoth, Lind & Ponack, L.L.P.

(57) ABSTRACT

A display device includes: a display panel including a display screen; a backlight having a light emission surface that illuminates the display screen of the display panel from behind; a second processor that superimposes the visible light communication signals on backlight control signals generated based on the image signal; and a second controller that divides the light emission surface of the backlight into regions and establishes a period during which control of light emission in each of the regions and control for turning off the backlight in each of the regions a different time are
(Continued)

performed based on the backlight control signals outputted by the second processor. When superimposing the visible light communication signals on the backlight control signals, the second processor does not superimpose a visible light communication signal in a period indicating an OFF state of the backlight in the backlight control signals.

14 Claims, 29 Drawing Sheets

(52) U.S. Cl.
CPC ... *G09G 2310/024* (2013.01); *G09G 2310/08* (2013.01); *G09G 2320/062* (2013.01); *G09G 2320/064* (2013.01); *G09G 2320/08* (2013.01); *G09G 2360/16* (2013.01)

(58) Field of Classification Search
CPC .......... G09G 2320/08; G09G 2360/16; G09G 3/3406; G09G 3/342; H04B 10/116
See application file for complete search history.

(56) References Cited

U.S. PATENT DOCUMENTS

| | | | |
|---|---|---|---|
| 7,948,469 B2 | 5/2011 | Kitaoka et al. | |
| 2007/0024571 A1* | 2/2007 | Maniam | H04B 10/116 345/102 |
| 2007/0262948 A1* | 11/2007 | Han | G09G 3/3406 345/102 |
| 2009/0002265 A1 | 1/2009 | Kitaoka et al. | |
| 2010/0302268 A1 | 12/2010 | Jun et al. | |
| 2011/0018911 A1 | 1/2011 | Kitaoka et al. | |
| 2011/0037790 A1 | 2/2011 | Onishi | |
| 2011/0216049 A1 | 9/2011 | Jun et al. | |
| 2014/0023378 A1 | 1/2014 | Bae et al. | |

FOREIGN PATENT DOCUMENTS

| | | |
|---|---|---|
| JP | 2007-183461 | 7/2007 |
| JP | 2007-295442 | 11/2007 |
| JP | 2009-212768 | 9/2009 |
| JP | 2013-128206 | 6/2013 |
| WO | 2006/011515 | 2/2006 |
| WO | 2010/098020 | 9/2010 |
| WO | 2013/015554 | 1/2013 |

OTHER PUBLICATIONS

International Search Report dated Oct. 21, 2014 in International (PCT) Application No. PCT/JP2014/003999.

\* cited by examiner

FIG. 1
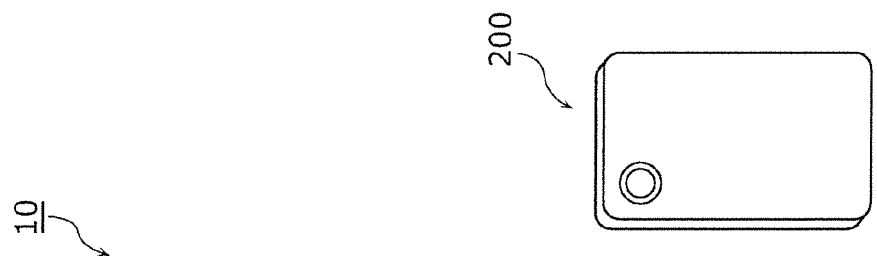
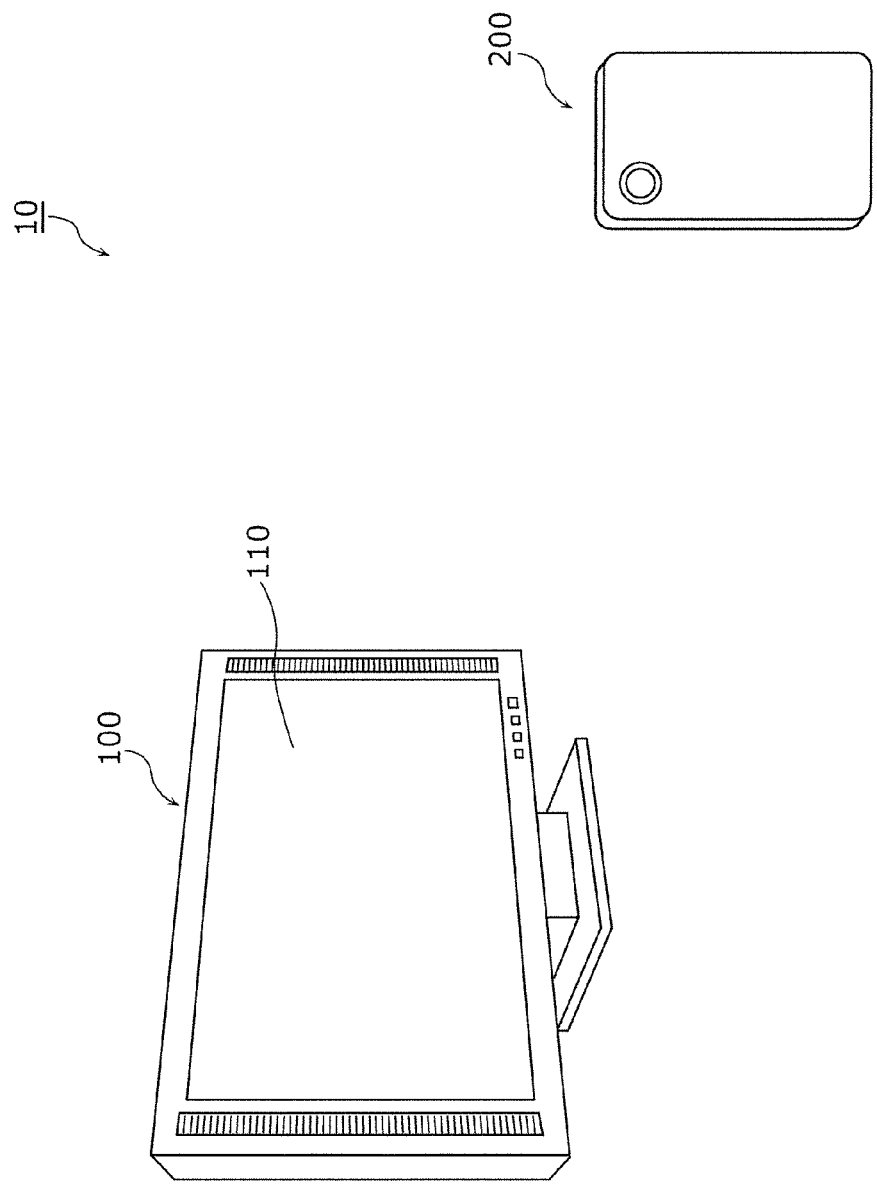

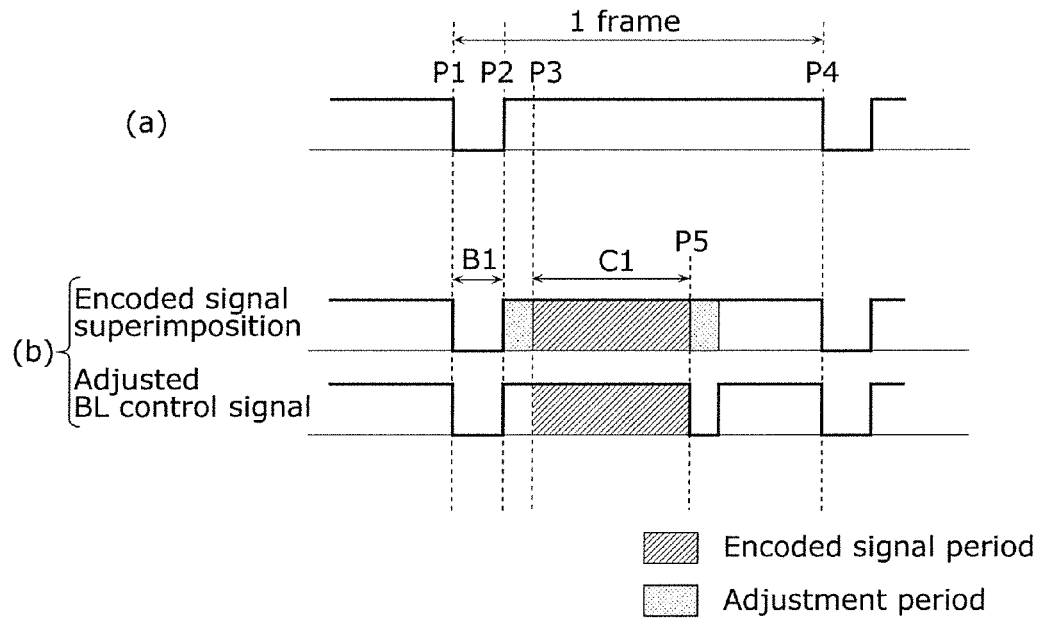
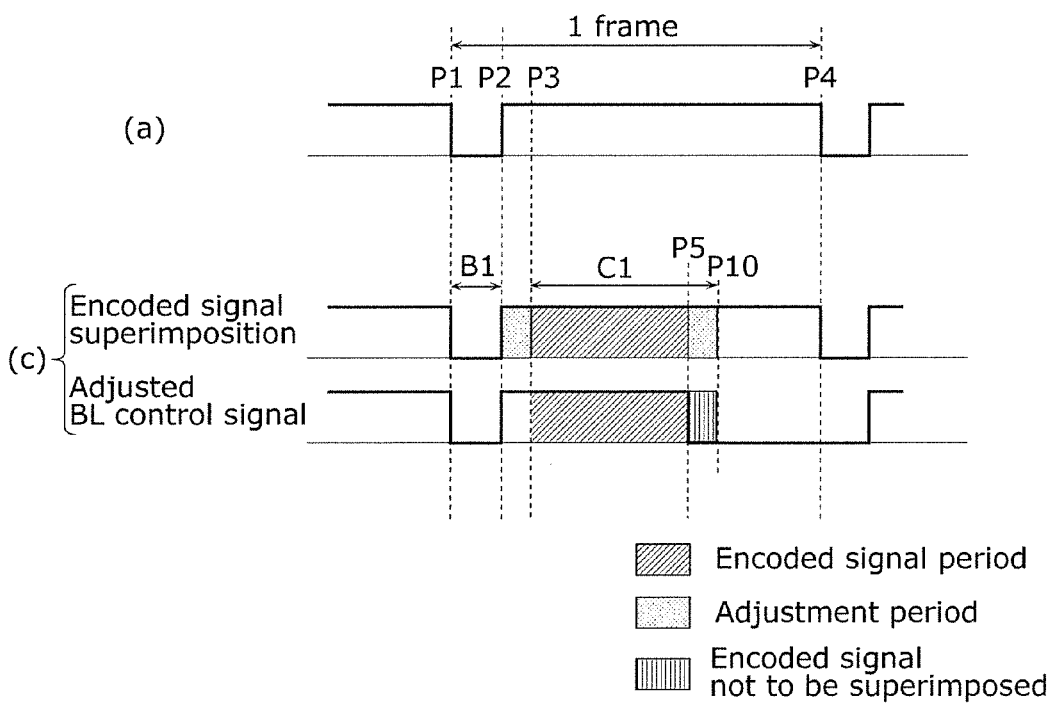

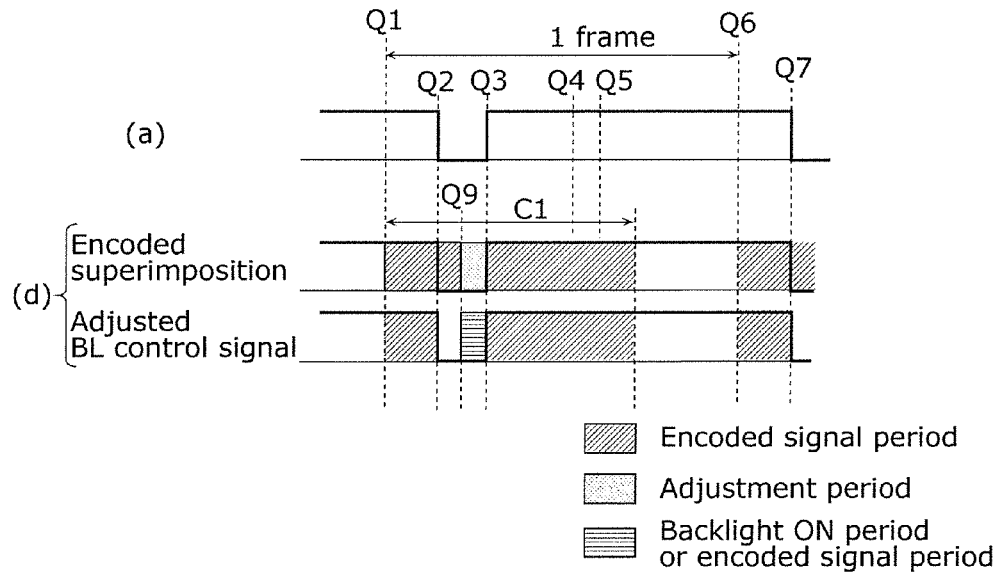
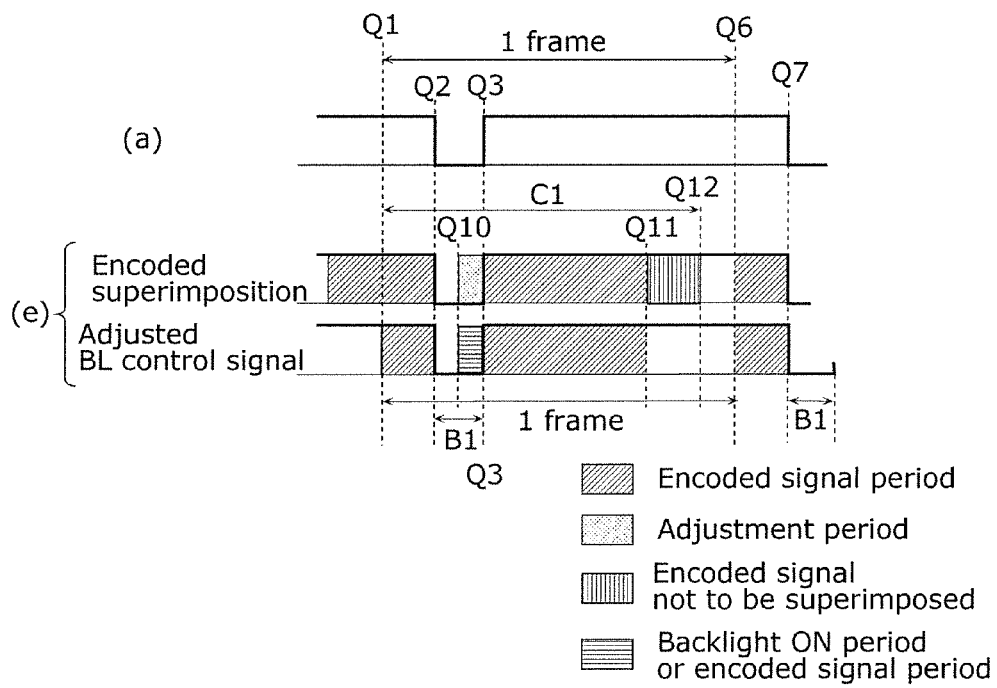

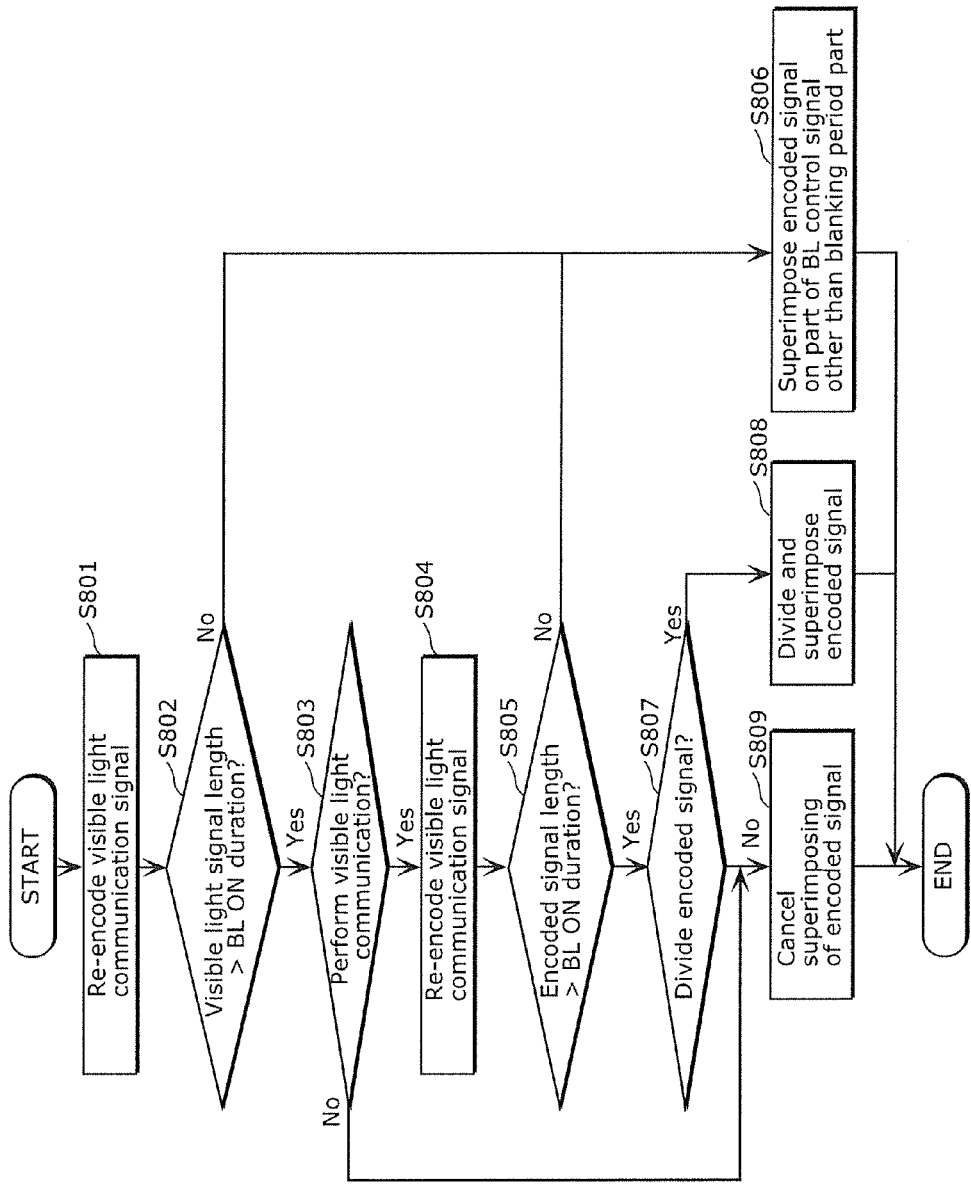

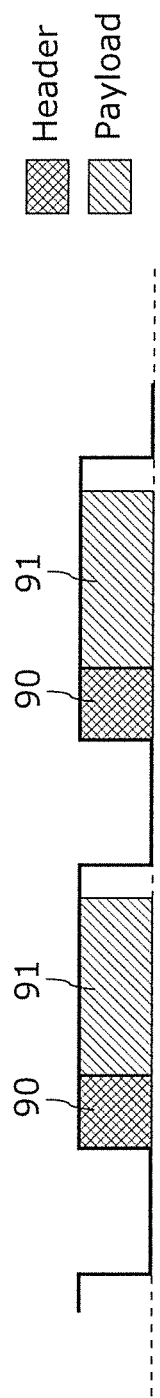

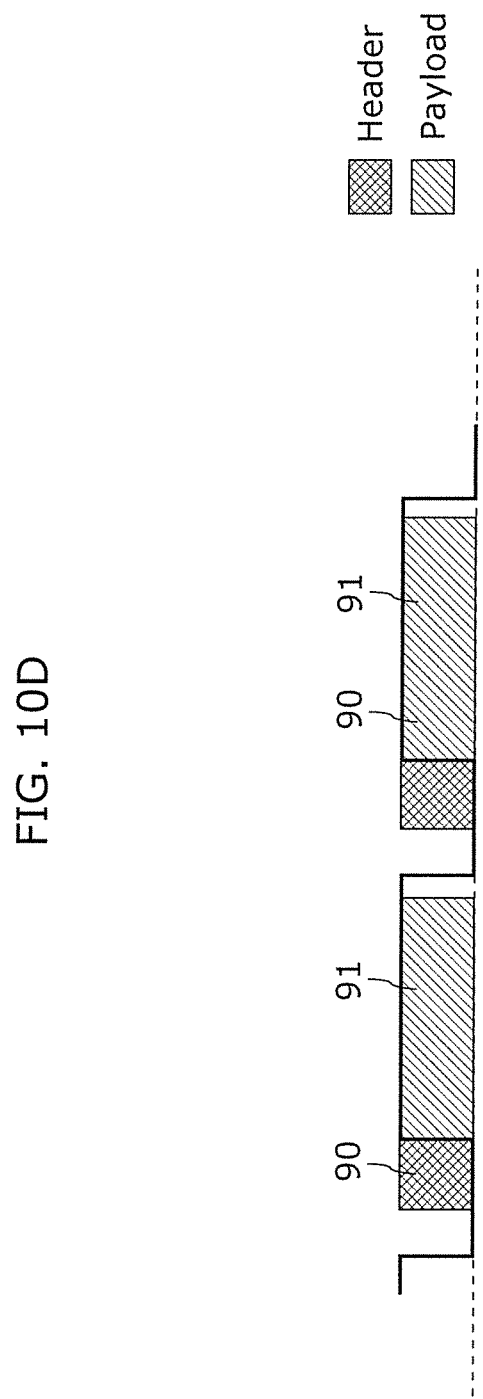

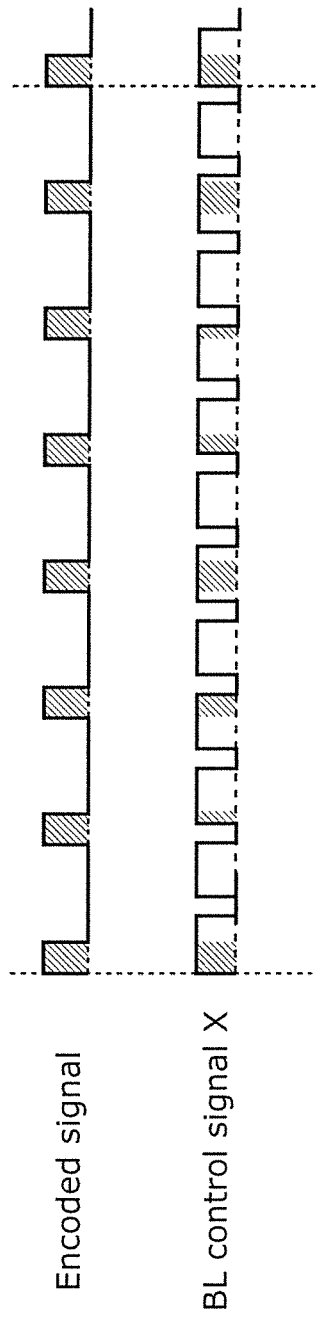

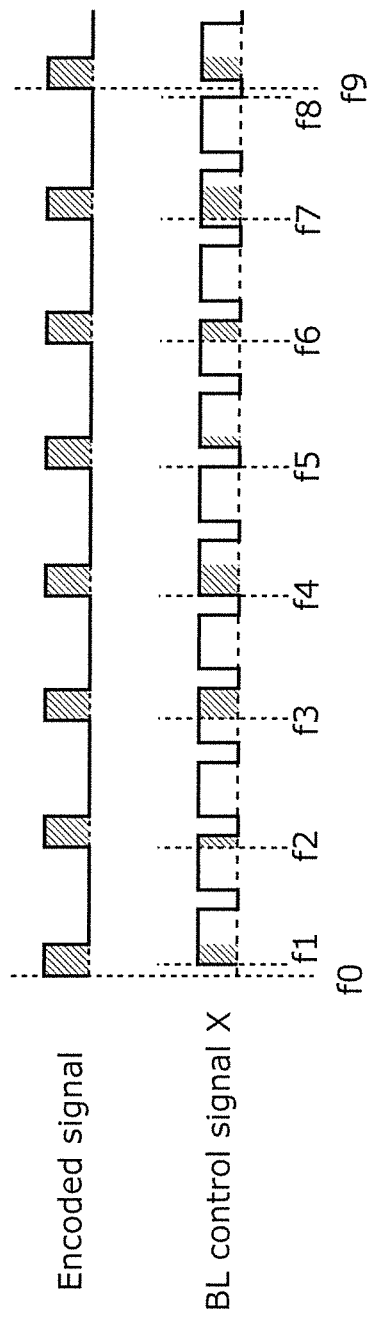

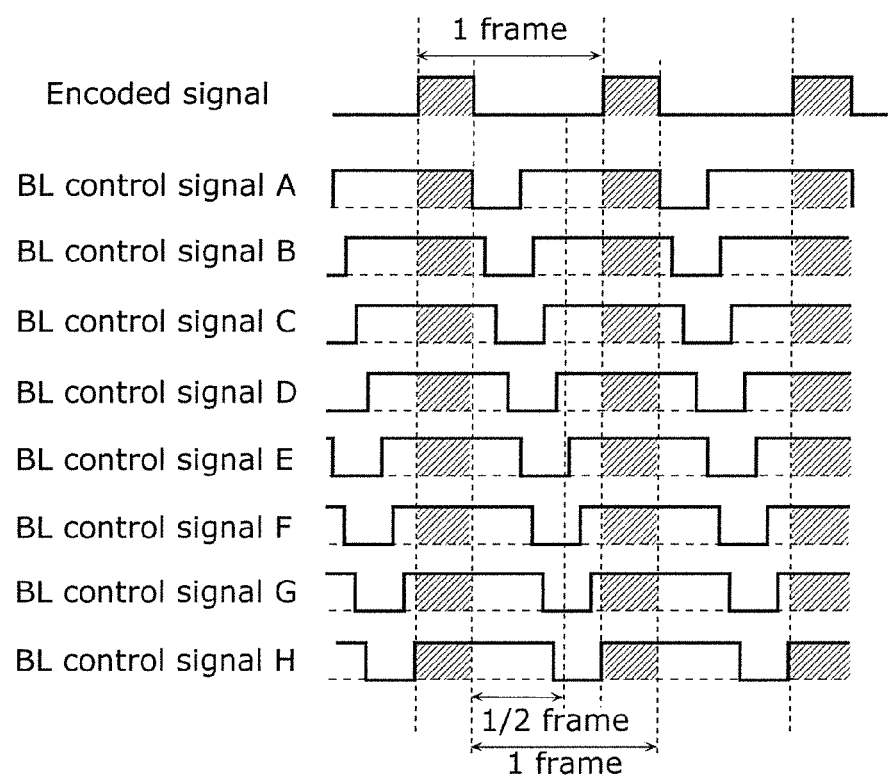

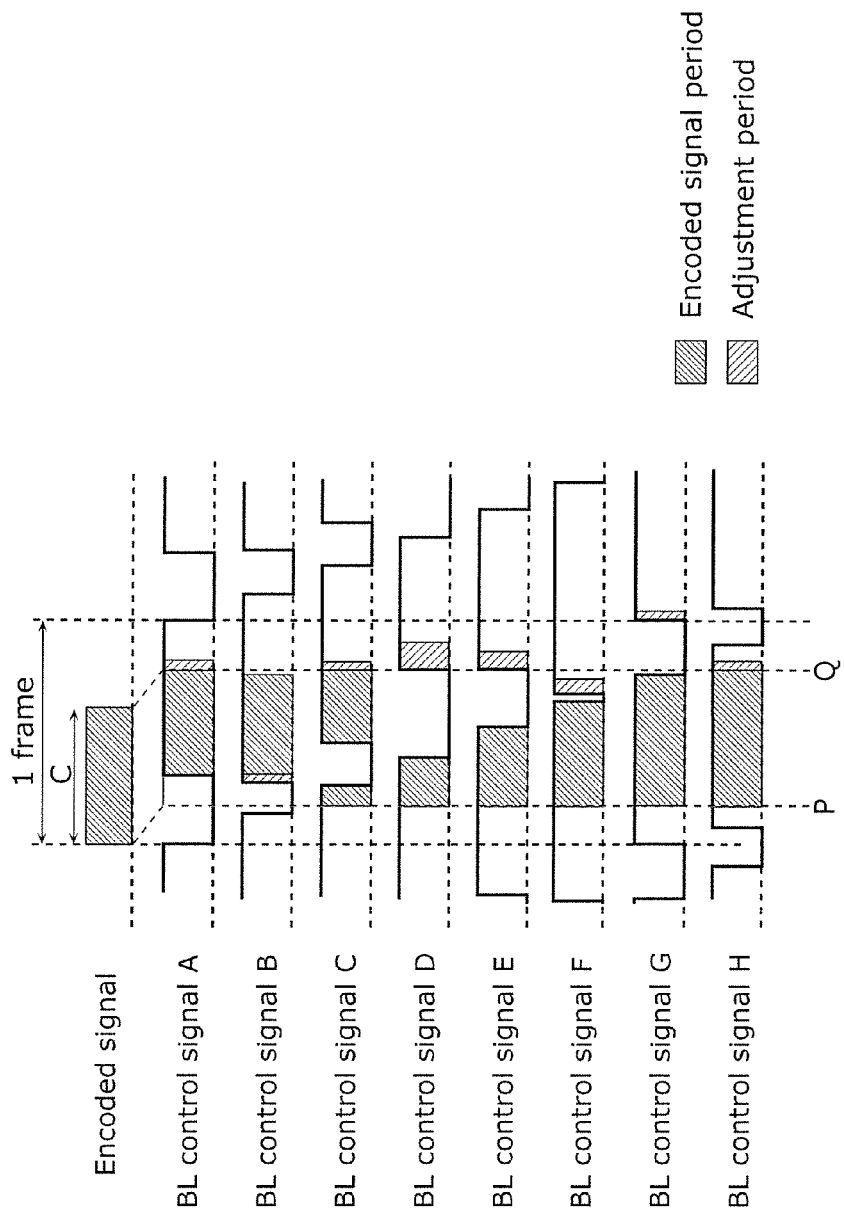

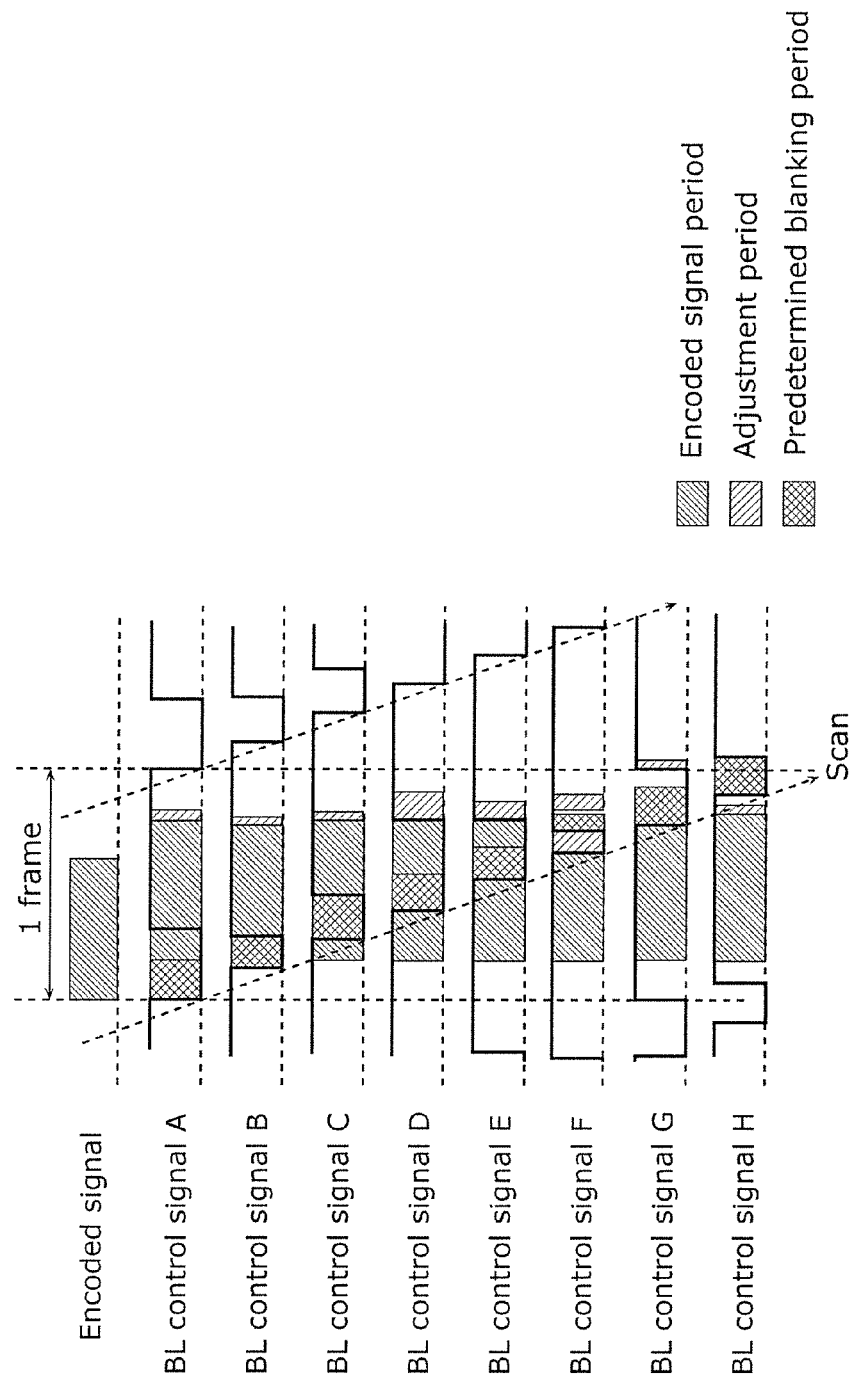

DISPLAY DEVICE INCLUDING SIGNAL PROCESSOR THAT SUPERIMPOSES VISIBLE LIGHT COMMUNICATION SIGNALS ON BACKLIGHT CONTROL SIGNALS GENERATED BASED ON AN IMAGE SIGNAL

CROSS REFERENCE TO RELATED APPLICATIONS

This is a continuation application of PCT International Application No. PCT/JP2014/003999 filed on Jul. 30, 2014, designating the United States of America, which is based on and claims priority of Japanese Patent Application No. 2013-221934 filed on Oct. 25, 2013. The entire disclosures of the above-identified applications, including the specifications, drawings and claims are incorporated herein by reference in their entirety.

FIELD

The present disclosure relates to a display device that outputs visible light communication signals and a method of controlling such a display device.

BACKGROUND

Patent Literature (PTL) 1 and 2 disclose techniques related to visual light communication. PTL 1 and 2 disclose communication techniques of superimposing communication information via visible light during normal video display in a video display device including a display or projector, for example.

CITATION LIST

Patent Literature

[PTL 1] Japanese Unexamined Patent Application Publication No. 2007-43706
[PTL 2] Japanese Unexamined Patent Application Publication No. 2009-212768

SUMMARY

Technical Problem

The present disclosure provides a display device capable of outputting visible light communication signals without significantly deteriorating the quality of the display image, and capable of reducing receiving error of output visible light communication signals, and a method for controlling such a display device.

Solution to Problem

The display device according to the present disclosure outputs visible light communication signals, and includes: a display panel including a display screen on which an image is displayed; a display controller that causes the display panel to display an image on the display screen of the display panel based on an image signal; a backlight having a light emission surface that illuminates the display screen of the display panel from behind; a signal processor that superimposes the visible light communication signals on backlight control signals generated based on the image signal; and a backlight controller that divides the light emission surface of the backlight into regions and establishes a period during which control of light emission in each of the regions and control for turning off the backlight in each of the regions a different time are performed based on the backlight control signals outputted by the signal processor. When superimposing the visible light communication signals on the backlight control signals, the signal processor does not superimpose a visible light communication signal in a period indicating an OFF state of the backlight in the backlight control signals.

Advantageous Effects

The display device according to the present disclosure is capable of outputting visible light communication signals without significantly deteriorating the quality of the display image, and capable of reducing receiving error of output visible light communication signals.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 1 is a schematic view of one example of a visible light communication system according to Embodiment 1.

FIG. 6A is a timing chart illustrating a second method according to Example 2 of Embodiment 1.

FIG. 6B is a timing chart illustrating the second method according to Example 2 of Embodiment 1.

FIG. 7C is a timing chart illustrating the second method according to Example 2 of Embodiment 1.

FIG. 7D is a timing chart illustrating the second method according to Example 2 of Embodiment 1.

FIG. 9 is a flow chart illustrating operations performed by the second processor according to Embodiment 2.

FIG. 10B illustrates a specific method for superimposing encoded signals on BL control signals according to Embodiment 2.

FIG. 10D illustrates a specific method for superimposing encoded signals on BL control signals according to Embodiment 2.

FIG. 17A illustrates the relationship between the phases of the BL control signal and the visible light communication signal according to Embodiment 4.

FIG. 17B illustrates the relationship between the phases of the BL control signal and the visible light communication signal according to Embodiment 4.

FIG. 19B is a timing chart illustrating operations performed by the second processor according to Embodiment 5.

FIG. 24 is a timing chart illustrating an example of operations performed by the second processor according to Embodiment 6.

FIG. 25 is a timing chart illustrating an example of operations performed by the second processor according to Embodiment 6.

DESCRIPTION OF EMBODIMENTS

Embodiment 1

Figure 2:
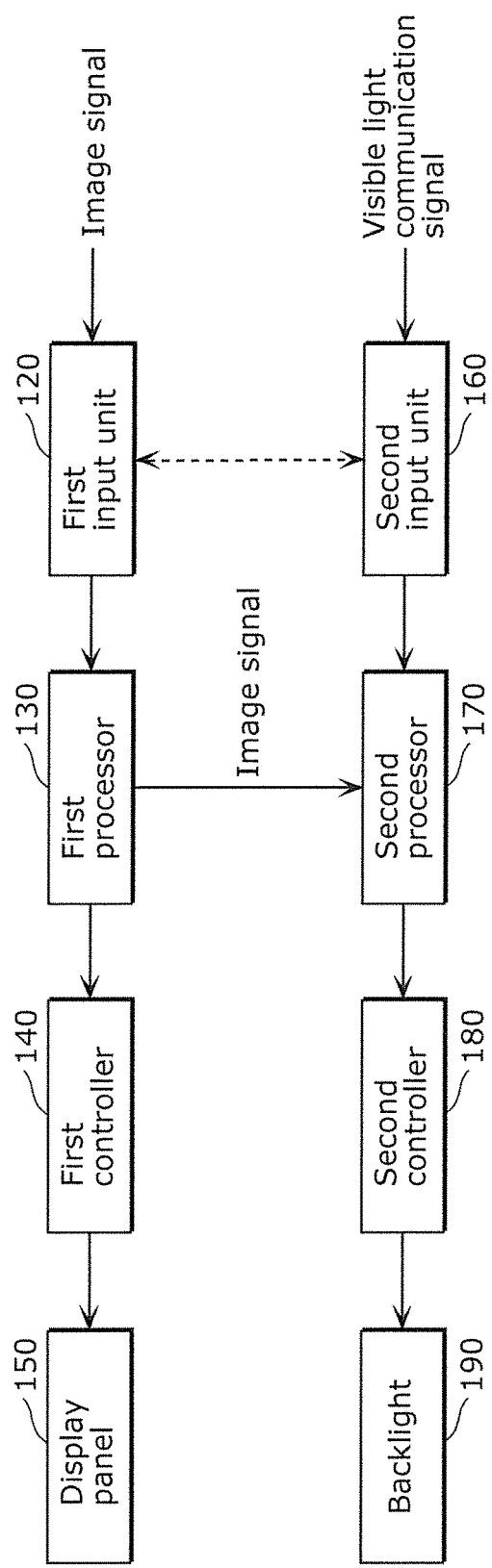
FIG. 2 is a block diagram of one example of a display device according to Embodiment 1.

Underlying Knowledge Forming Basis of the Present Disclosure

In recent years, in fields related to display devices, and in particular liquid crystal displays and projectors that use liquid crystals, a technique known as backlight scanning has been employed in an effort to improve image quality. Backlight scanning is a backlight control method which improves the slow reaction speed of the liquid crystals and improves motion blur that can be seen in sample-and-hold displays. In this method, the display screen is divided into regions (backlight regions), and light emission of the backlight is controlled such that the regions sequentially emit light at fixed periods. More specifically, backlight scanning is a control method that establishes backlight OFF periods, and the timing for these cyclic OFF periods (blanking periods) for each of the backlight regions are set to be different from one another. Generally, control is often performed to synchronize the timing of the blanking period with the timing of the scanning.

However, as disclosed in PTL 1, in visible light communication, visible light communication signals are superimposed by strobing the backlight. As such, transmission of visible light communication signals is not possible during the backlight OFF period. Moreover, this OFF period can cause signal transmission failure. As such, the only choice is to stop the scanning of the backlight and transmit the visible light communication signals, which sacrifices image quality.

In light of this, the present disclosure provides a display device capable of outputting visible light communication signals without significantly deteriorating the quality of the display image, and capable of reducing receiving error of output visible light communication signals.

Hereinafter, non-limiting embodiments will be described in detail with reference to the accompanying drawings. However, unnecessarily detailed descriptions may be omitted. For example, detailed descriptions of well-known matters or descriptions of components that are substantially the same as components described previous thereto may be omitted. This is to avoid unnecessary redundancy and provide easily read descriptions for those skilled in the art.

The following description and drawings are provided to assist those skilled in the art in understanding the present disclosure, and are not intended to limit the scope of the claims.

Embodiment 1

Hereinafter, Embodiment 1 will be described with reference to FIG. 1 through FIG. 8.

(1. Configuration)

FIG. 1 is a schematic view of one example of a visible light communication system according to Embodiment 1.

(1.1 Visible Light Communication System Configuration)

The visible light communication system 10 illustrated in FIG. 1 includes a display device 100 and a smartphone 200.

The display device 100 is, for example, a television, and can display an image on a display screen 110. The display device 100 can also superimpose visible light communication signals onto the display screen 110.

The smartphone 200 is one example of an electronic device that receives visible light communication signals, and can receive the visible light communication signals transmitted from the display device 100. With this, the user of the smartphone 200 can obtain, for example, information on the image being displayed on the display device 100.

Note that in Embodiment 1, the display device 100 is merely exemplified as a monitor that displays an image, such as a television or display; the display device 100 is not limited to this example. The display device 100 may be a device that projects an image such as a projector. Similarly, the smartphone 200 is merely given as an example of an electronic device that receives visible light communication signals output from the display device 100; any device that can receive visible light communication signals is acceptable and is not limited to a smartphone. For example, the electronic device may be a receiver that conforms to the JEITA CP-1222 standard. Moreover, the electronic device is not limited to a smartphone and may be a general handheld device. Moreover, the electronic device may obtain information by receiving visible light communication signal and decoding the received visible light communication signals.

The information transmission method used to transmit the visible light communication signals may be a method that conforms to the JEITA CP-1223 standard currently being developed as an international standard, or the IEEE P802.15 standard already instituted. Stated differently, the electronic device may use a receiver that conforms to one or more of these standards.

(1.2. Configuration of Display Device)

FIG. 2 is a block diagram of one example of the display device according to Embodiment 1.

The display device 100 illustrated in FIG. 2 is a display device that outputs visible light communication signals, and includes a first input unit 120, a first processor 130, a first controller 140, a display panel 150, a second input unit 160, a second processor 170, a second controller 180, and a backlight 190.

The first input unit 120 receives an input of an image signal related to an image displayed on the display panel 150. The image signal is input into the first input unit 120 via, for example, an antenna cable, image signal line, composite cable, HDMI® cable, PJLink cable, or LAN cable, from, for example, a broadcast wave, a video recording and playback device, or PC. Here, the image signal may be stored on various kinds of recording mediums using a video recording device or playback device, for example.

The first processor 130 receives an input of the image signal from the first input unit 120. The first processor 130 performs general image processing, such as image enhancement, on the image signal. The first processor 130 transmits the image-processed image signal to the first controller 140. The first processor 130 also transmits information indicating the size, display timing, brightness, etc., of the subframes and image signal to the first controller 140 and the second processor 170.

Note that the first processor 130 may output a duty ratio calculated based on the image signal and the backlight control signal (hereinafter also referred to as BL control signal) for each region to the second processing unit.

The display panel 150 is, for example, a liquid crystal display panel, and includes the display screen 110 that displays an image.

The first controller 140 is one example of the display controller. The first controller 140 causes the display panel 150 to display an image on the display screen 110 of the display panel 150 based on an image signal. In Embodiment 1, the first controller 140 causes the display panel 150 to display an image based on an image signal transmitted from the first processor 130. More specifically, the first controller 140 controls the aperture of the liquid crystals of the display panel 150 based on an image signal transmitted from the first processor 130.

The second input unit 160 receives an input of a signal used in visible light communication (hereinafter also referred to as a visible light communication signal), and transmits the input visible light communication signal to the second processor 170. In Embodiment 1, a visible light communication signal generated on, for example, a PC is input into the second input unit 160 via a proprietary cable or a LAN cable, for example.

Note that the visible light communication signal may be superimposed on part of a radio wave and input into the second input unit 160 via an antenna cable. The visible light communication signal may also be recorded on a variety of different types of recordable mediums via a video recording device or playback device and input into the second input unit 160. For example, a visible light communication signal recorded by a video recording device may be placed on a portion of a line of a HDMI® cable or a PJLink cable, for example, and input into the second input unit 160. Moreover, a visible light communication signal generated on a separate PC may be superimposed on an image signal, and the image signal may be input into the second input unit 160 from a video recording device or playback device.

Note that other than receiving inputs from external devices, the second input unit 160 may obtain the visible light communication signal by reading server information via the internet using information internally stored in the display device, such as the ID of the display device.

The second processor 170 generates an encoded signal by encoding the visible light communication signal input via the second input unit 160, and calculates a duty based on at least one of the image signal and the visible light communication signal. The second processor 170 superimposes the encoded signal onto the BL control signal input from the first processor 130.

In Embodiment 1, the encoded signal is described as a signal having a given proportion of ON periods and OFF periods. Moreover, the encoded signal is described as a signal encoded using an inverted-4 PPM method. Note that the encoded signal may be encoded using Manchester encoding, for example. Moreover, the modulated signal is described as having a 100% ON/OFF modulation percentage, but the modulated signal is not limited to this example. For example, when high/low modulation is used rather than 100% modulation percentage, ON/OFF in the following description may be read as high/low and implemented. Regarding the duty of the visible light communication signal as well, in addition to the ON period being a value determined by a standard for the whole period during which the signal is transmitted, it may be read in concert with (high level×high period+low level×low period)/(signal transmission period×high level).

More specifically, the second processor 170 is one example of the signal processor, and superimposes the visible light communication signals on the backlight control signals generated based on the image signals. However, when the second processor 170 superimposes the visible light communication signals on the backlight control signals, the second processor 170 does not superimpose the visible light communication signals in periods indicating an OFF state of the backlight in the backlight control signals. Note that the encoded visible light communication signal (encoded signal) may also be referred to simply as the visible light communication signal.

The second controller 180 is one example of the backlight controller. The second controller 180 divides the light emission surface of the backlight 190 into regions and, based on the backlight control signal (BL control signal) outputted by the second processor 170, establishes a period during which control of light emission in each of the regions and control for turning off each of the regions a different time are performed. In Embodiment 1, the second controller 180 controls the brightness of and timing for the backlight 190 based on the backlight control signal (BL control signal) transmitted from the second processor 170.

The backlight 190 emits light from behind the display panel 150. More specifically, the backlight 190 has a light emission surface that emits light from behind the display screen 110 of the display panel 150. This allows the viewer to view an image displayed on the display panel 150.

In Embodiment 1, the light emission surface of the backlight 190 is divided into a plurality of regions, and the light emission of each region is sequentially controlled to scan the backlight. Note that the regions of the light emission surface of the backlight 190 correspond to regions of the display screen 110.

(2. Display Device Operations)

Next, operations performed by the display device 100 having the above configuration will be described.

The display device 100 sequentially scans the backlight across the entire screen of the display panel 150 by sequentially turning off the backlight in conjunction with writing of the image signal.

Typically, with liquid crystal display panels, the phase change of the liquid crystals is slow, and even if image signals are switched to indicate different gradations, switching between the signals takes time. Thus, by temporarily turning off the backlight of the display panel to scan the backlight, video characteristics can be improved, such as bleeding resulting from video being displayed while switching the signals. However, scanning speed for switching continues to improve year by year; typical scanning speed of 60 frames per second has improved to where double or four times that scanning speed is possible. When scanning at high speeds, more fluid video characteristics can be achieved by interpolating frames between normal frames to change the images in more gradual steps.

For this reason, backlight scanning in which the backlight is turned off while scanning the backlight is significantly important to improving video characteristics, and not superimposing the visible light communication signal during the OFF periods associated with backlight scanning is better in terms of video characteristics.

For the above reasons, in the display device 100, visible light communication signals are not output during the OFF periods (hereinafter also referred to as blanking periods) associated with backlight scanning.

Hereinafter a method for (operations for) receiving visible light communication signals at a high success rate with a receiver such as the smartphone 200 even when the display device 100 does not output visible light communication signals during the blanking periods of the backlight control signals (BL control signals) will be described.

Example 1 of Embodiment 1

2.1.1 One Example of Operations Performed by Second Processor

Figure 3A:
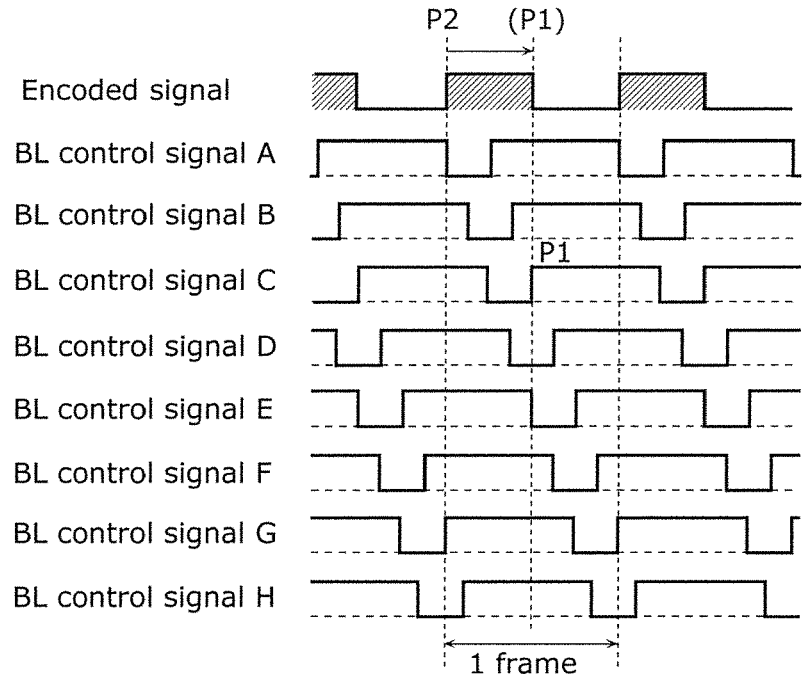
FIG. 3A illustrates one example of a state before visible light communication signals are superimposed on BL control signals according to Example 1 of Embodiment 1.
Figure 3B:
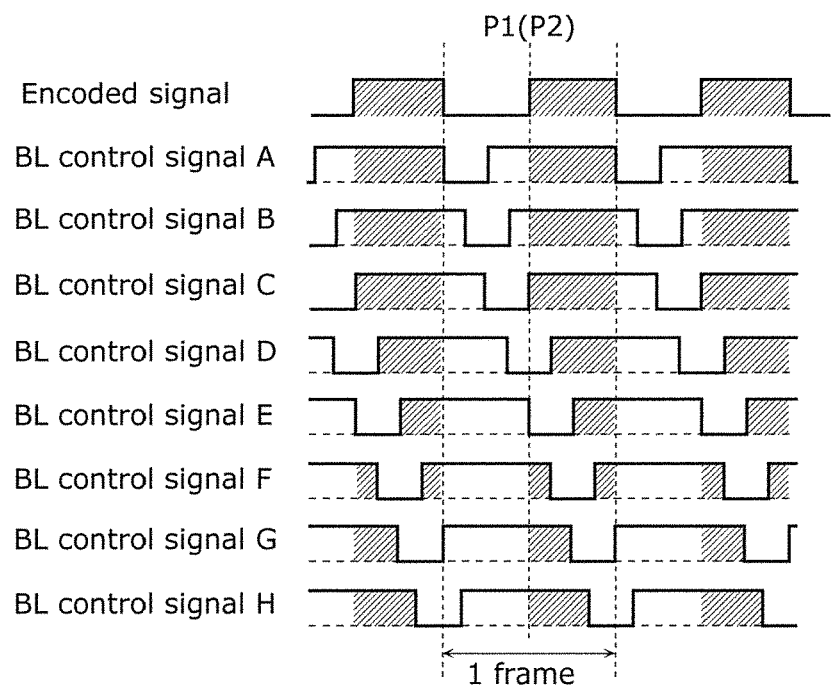
FIG. 3B illustrates one example of a state after the visible light communication signals have been superimposed on the BL control signals according to Example 1 of Embodiment 1.

FIG. 3A illustrates one example of a state before the visible light communication signals are superimposed on the BL control signals according to Example 1 of Embodiment 1, and FIG. 3B illustrates one example of a state after the visible light communication signals have been superimposed on the BL control signals according to Example 1 of Embodiment 1.

FIG. 3A and FIG. 3B illustrate an example in which BL control signals A through H, which correspond to the eight regions A through H resulting from dividing the display region of the display screen 110, are input to control the backlight 190. The hatched portions indicate regions where encoded signal (visible light communication signal) is present.

The encoded signal illustrated in FIG. 3A is superimposed on the BL control signals A through H at different phases, and when out of phase encoded signals are mixed within the reception range of the receiver, an error (visible light communication signal receiving error) occurs when the receiver decodes the encoded signals.

Therefore, in Example 1 of Embodiment 1, in a given region of the display region, the encoded signals (visible light communication signals) are superimposed in phase, as illustrated in FIG. 3B.

Here, "in phase" is exemplified as meaning the synchronization of the rise timing, but "in phase" is not limited to this example. Any point from a state before the start of the rise to a state at which the rise ends may determined as the rise time. Moreover, since there is a delay time along the control signal voltage, for example, in synchronization does not mean that the timings simply match; "in phase" also includes instances where a given delay time or a delay time within a given period exist. The same applies hereinafter.

Here, since the backlight sequentially turns off with each region in the case of sequential scanning, it is difficult to superimpose the encoded signals without including the OFF periods (blanking periods) at all. Thus, in Example 1 of Embodiment 1, in a specific region among regions into which the display region is divided (hereinafter the specific region is also referred to as the reference region), the timing at which the encoded signal is superimposed is synchronized with the end of the OFF period (the blanking period). Note that in regions other than the specific region (the reference region), encoded signals are superimposed in phase with the encoded signal of the reference region as well, but the encoded signals are not superimposed during the OFF periods (the blanking periods), which are the periods during which the backlight is turned off.

In the example illustrated in FIG. 3B, the second processor 170 sets region C into which BL control signal C is inputted as the reference region, and the encoded signals are superimposed on the BL control signals A through H in phase after adjusting the superimposition timing of the encoded signals to synchronize the head (rise timing) P2 of the encoded signal with the rise timing P1 of BL control signal C in FIG. 3A. Then, upon superimposing the encoded signals on the BL control signals A through H, the second processor 170 superimposes the encoded signals during the ON periods of the BL control signal but does not superimpose the encoded signals during the OFF periods.

Note that the reference region is not limited to region C. Hereinafter, examples will be given of regions that can be set as the reference region in Example 1 of Embodiment 1. For example, the reference region may be the brightest region among regions into which the display region is divided (in other words, the region whose blanking period is the shortest or the region where the light transmissivity of the display panel is the greatest).

Note that even when the brightest region is set as the reference region, when the position of the reference region is changed every frame, further provision is required. This is because the position of the encoded signal superimposed every frame changes, and the balance of the video drastically changes every frame, leading to flickering. Moreover, when provisions such as cutting off one of overlapping encoded signals midway when periods of encoded signals to be superimposed overlap between regions or not superimposing during a first predetermined period are not implemented, receiving errors at the receiver may arise. Thus, when changing the position of the reference region every frame, at least for one frame period, a period where the encoded signal is not superimposed may be established.

Moreover, when a bright region is set as the reference region, the bright region may be determined with reference to transition of the center of the brightness of the image based on the image signal by the first processor 130, rather than the bright region bring determined with reference to the brightness of the display region in every frame.

Moreover, when there is no change in brightness of the entire display region above a certain level, such as when the scene does not switch for a given period of time, a region including the brightest location in the display region based on the average of the image signal during the given period of time may be set as the reference region. Note that the reference region may be determined in advance.

2.1.2 Advantageous Effects, Etc

As described above, the display device (100) according Example 1 of Embodiment 1 outputs visible light communication signals, and includes: a display panel (150) including a display screen on which an image is displayed; a display controller (the first controller 140) that causes the display panel to display an image on the display screen of the display panel based on an image signal; a backlight (190) having a light emission surface that illuminates the display screen of the display panel (150) from behind; a signal processor (the second processor 170) that superimposes the visible light communication signals on backlight control signals generated based on the image signal; and a backlight controller (the second controller 180) that divides the light emission surface of the backlight (190) into regions and establishes a period during which control of light emission in each of the regions and control for turning off the backlight in each of the regions a different time are performed based on the backlight control signals outputted by the signal processor (the second processor 170). When superimposing the visible light communication signals on the backlight control signals, the signal processor (the second processor 170) does not superimpose a visible light communication signal in periods indicating an OFF state of the backlight (190) in the backlight control signals.

This configuration provides a display device capable of outputting visible light communication signals without significantly deteriorating the quality of the display image, and capable of reducing receiving error of output visible light communication signals.

Moreover, the signal processor (the second processor 170) may superimpose the visible light communication signals on the backlight control signals corresponding to the regions in a one-to-one manner, and the visible light communication signals superimposed on the backlight control signals corresponding to the regions may be in phase with one another.

With this, receiving error of the visible light communication signals can be inhibited.

Here, for example, based on the backlight control signal corresponding to a predetermined region among the regions, the signal processor may match phases of the visible light communication signals superimposed on the backlight control signals corresponding to the regions.

With this, periods of visible light communication signals not superimposed during blanking periods can be minimized.

Moreover, the predetermined region may be the brightest region among the regions, and may be a region corresponding to an edge portion of the display screen among the regions.

With this, the effect of the decrease in brightness due to the turning off of the backlight due to the visible light communication signal can be inhibited.

Example 2 of Embodiment 1

Hereinafter an example will be given where the length of the blanking period is the same for each region in the display region.

The total time the backlight 190 is turned off (the total OFF period) is calculated by adding the blanking period, which is the OFF period of the BL control signal, and the OFF period of the encoded signal.

As such, even if the encoded signal is superimposed right after the end of the blanking period in the reference region and the encoded signal is completely included from that blanking period to the next blanking period, the period during which the backlight 190 is turned off is extended by the length of the OFF period of the encoded signal superimposed on the BL control signal. In other words, when the encoded signal is superimposed, the reference region is darker than before the encoded signal is superimposed.

However, in a region other than the reference region, for example, since the encoded signal is not superimposed during the blanking period, this overlaps with the blanking period, and the length of time the backlight 190 is turned off is shorter than the reference region by the length of the OFF period among the encoded signal periods during which the encoded signals are not superimposed. In other words, in a region other than the reference region, for example, if the encoded signal is superimposed, there are instances where that region will become brighter than the reference region.

In order to improve this, two methods for establishing an adjustment period during which the backlight 190 is either turned on or turned off are conceivable. The first method is matching the total OFF periods of the other regions to the total OFF period of the reference region in order to make the total OFF period of the reference region the longest. The second method is matching the total OFF periods for all regions to a total OFF period determined based on the original image signal.

2.2.1 One Example of Operations Performed by Second Processor in Accordance with First Method First, operations performed by the second processor 170 in accordance with the first method will be described with reference to FIG. 4 and FIG. 5.

Figure 4:
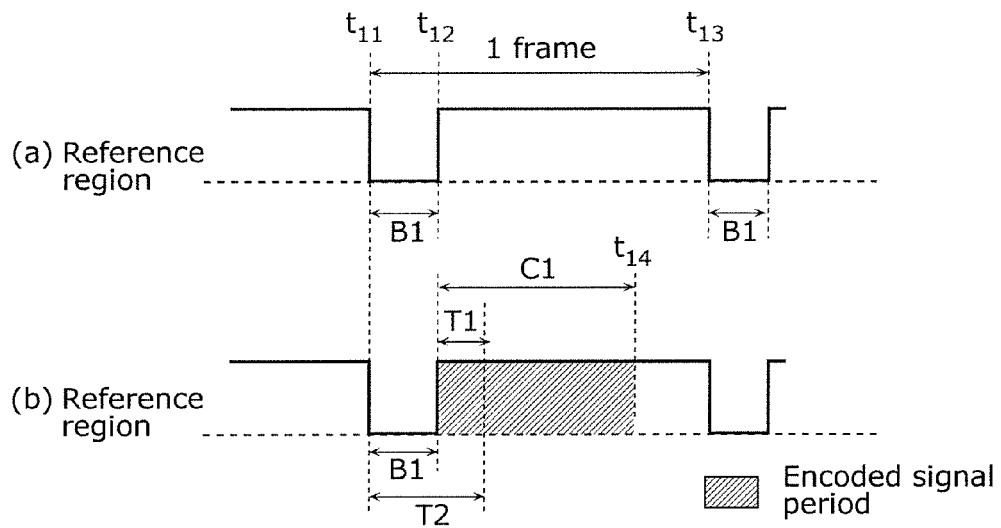
FIG. 4 is a timing chart illustrating a first method according to Example 2 of Embodiment 1.
Figure 5:
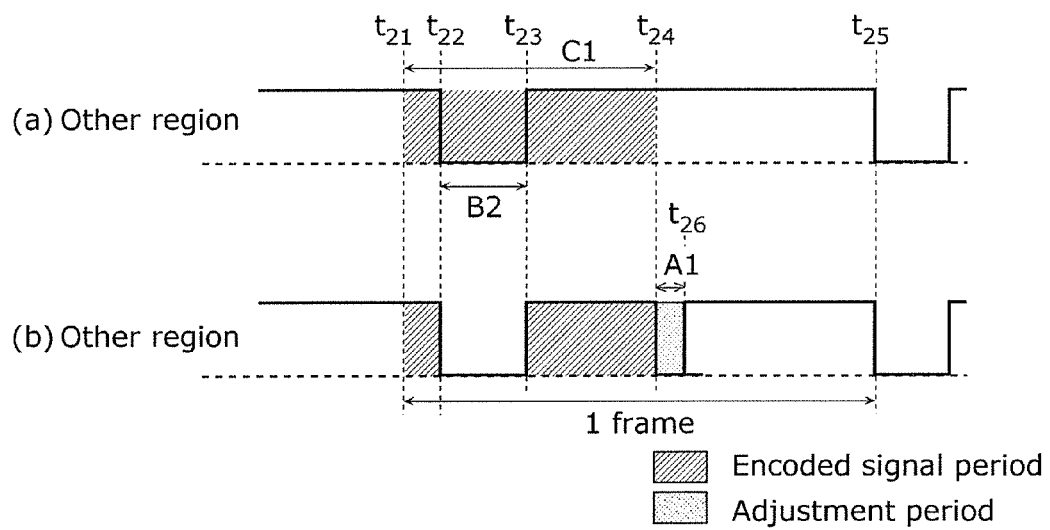
FIG. 5 is a timing chart illustrating the first method according to Example 2 of Embodiment 1.

FIG. 4 and FIG. 5 are timing charts illustrating the first method according to Example 2 of Embodiment 1. (a) in FIG. 4 illustrates the BL control signal corresponding to the reference region before superimposition of the encoded signal, and (b) in FIG. 4 illustrates the BL control signal corresponding to the reference region after superimposition of the encoded signal. (a) in FIG. 5 illustrates the BL control signal corresponding to a different region before superimposition of the encoded signal, and (b) in FIG. 5 illustrates the BL control signal corresponding to a different region after superimposition of the encoded signal.

More specifically, FIG. 4 illustrates an example of when the second processor 170 superimposes the encoded signal on the BL control signal after adjusting the head (rise timing) of the encoded signal to the rise timing of the BL control signal of the reference region (time t12). FIG. 5 illustrates an example of when the second processor 170 superimposes, on the BL control signal corresponding to a different region, an encoded signal in phase with the encoded signal superimposed on the BL control signal corresponding to the reference region.

In other words, FIG. 4 and FIG. 5 illustrate an example of when the second processor 170 superimposes, on the BL control signals corresponding to the regions, encoded signals in phase with the other regions at the same time as the blanking period of the reference region ends. Note that not superimposing the encoded signal during the blanking period is a priority for the blanking periods for each of the regions, similar to Example 1 of Embodiment 1.

As illustrated in (b) in FIG. 4, in the reference region, other than the blanking period B1 from, for example, time t11 to time t12, encoded signal OFF period T1, which is the total OFF period of the encoded signal during the encoded signal period C1 from, for example, time t12 to time t14, is also present.

Thus, in the reference region illustrated in (b) in FIG. 4, when the duty of the encoded signal is used, the total OFF period of the encoded signal in one frame from, for example, time t11 to time t13 (the encoded signal OFF period) can be represented as encoded signal OFF period T1=encoded signal period C1×(1−Duty).

As illustrated in (b) in FIG. 4, in the reference region, since there is generally no period in which the encoded signal period C1 and the blanking period B1 overlap, total OFF period T2 for one frame=blanking period B1+encoded signal OFF period T1. In other words, the total OFF period in the reference region is longer than the other regions.

However, in a region other than the reference region, there is a chance that the encoded signal period and the blanking period will overlap. As described above, with respect to the blanking period, the BL control signal takes priority over the encoded signal, so the encoded signal is not superimposed.

As such, as is illustrated in (b) in FIG. 5, in a region other than the reference region, in the encoded signal period C1 between, for example, time t21 and time t24, the total OFF period is shorter than that of the reference region by the length of the encoded signal OFF period in the encoded signal period C1 that overlaps with the blanking period B2 between time t22 and time t23.

Here, when the period of the encoded signal that overlaps with the blanking period is B2, the total encoded signal OFF period in the encoded signal period C1 (the encoded signal OFF period) can be represented as (encoded signal OFF period)=(encoded signal period C1−blanking period B2)×(1−Duty).

As described above, when the total OFF period for each region of the screen (display region) is different, the brightness of the regions is uneven, which reduces image quality.

Therefore, by operating according to the first method where an adjustment period during which the backlight 190 is either turned on or turned off is established, the second processor 170 can match the total OFF periods for the regions in the screen.

More specifically, the second processor 170 matches the total OFF period for the regions other than the reference region with the total OFF period of the reference region in accordance with the first method, and establishes an adjustment period for adjusting the difference in the regions other than the reference region with the total OFF period per frame in the reference region. Note that as described above, in Example 2 of Embodiment 1, it is presumed that the length of the blanking period for each region is the same.

Here, in (b) in FIG. 5, the adjustment period from time t24 to time t26 is represented as blanking period B2×(1−Duty). In other words, the adjustment period in each region other than the reference region can be calculated from the blanking period, encoded signal period, and encoded signal phase of each region including the reference region. In (b) in FIG. 5, the adjustment period is exemplified as being located in one frame between one frame from time t21 to time t25.

In this way, the display device 100 according to Example 2 of Embodiment 1 causes the second processor 170 to establish an adjustment period according to the first method. With this, the display device 100 can output encoded signals without greatly altering image quality, although the brightness of the screen (display region) as a whole decreases by a certain amount due to the superimposition of the encoded signals on the BL control signals.

Note that the second processor 170 establishing the adjustment period directly after the encoded signal period is preferred because the adjustment period can be stably located as close as possible to the blanking period, during which change in phase of the liquid crystals of the display panel 150 is great, but this is merely an example to which the placement of the adjustment period should not be limited. The second processor 170 may establish the adjustment period up to the time when the next encoded signal is to be superimposed.

2.2.2 One Example of Operations Performed by Second Processor in Accordance with Second Method Next, operations performed by the second processor 170 in accordance with the second method will be described.

The adjustment period during which the backlight 190 is either turned on or off to adjust the total OFF period generally can be defined as follows. When the original OFF period of the backlight 190 based on the image signal (the blanking period and the black video period) is T4, the total OFF period of the encoded signal in an encoded signal period not overlapping with the blanking period among encoded signal periods is T5, and the blanking period after superimposition of the visible light communication signal is T6, the adjustment period can be represented as T4−T5−T6. Note that, as previously described, the adjustment period is preferably located as close as possible to the blanking period.

For example, in the reference region, T5 can be calculated by first summing the totals of encoded signal OFF periods in the encoded signal period and then subtracting the totals of OFF periods in the portion of the encoded signal overlapping the blanking period.

Hereinafter, operations performed by the second processor 170 in accordance with the second method will be described in detail with reference to FIG. 6A through FIG. 7D.

FIG. 6A through FIG. 7D are timing charts illustrating the second method according to Example 2 of Embodiment 1.

First, with reference to FIG. 6A through FIG. 6D, operations performed by the second processor 170 with respect to establishing an adjustment period according to the second method when the encoded signal period and the blanking period do not overlap will be described.

In FIG. 6A through FIG. 6D, the top half, as indicated by (a), illustrates the BL control signal before superimposition of the encoded signal, and the bottom half, as indicated by (b) through (e), indicates the (i) BL control signal after superimposition of the encoded signal and (ii) the BL control signal adjusted in accordance with the second method. In these figures, the blanking period is indicated as B1 and the encoded signal period is indicated as C1.

The method of adjusting the BL control signal superimposed with the encoded signal in accordance with the second method is separated into four different cases illustrated in FIG. 6A through FIG. 6D based on the relationship between (i) a sum (temporal sum) of the adjustment period, the encoded signal period, and the blanking period and (ii) whether the adjustment period is positive or negative. Hereinafter, each case will be described.

(Adjustment Method for when Encoded Signal Period and Blanking Period do not Overlap (Case 1))

FIG. 6A illustrates an example where the adjustment period is 0 or greater and (adjustment period+encoded signal period+blanking period) is shorter than or equal to the length of one frame.

As illustrated in the top half of (b) in FIG. 6A, part of the adjustment period starts at the end time P2 of blanking period B1 and ends at the start time P3 of the encoded signal period C1, and the remaining part of the adjustment period is located after the encoded signal period, preferably directly after the encoded signal period (at time P5).

As a result of the second processor 170 establishing the adjustment period indicated in the top half of (b) in FIG. 6A, the BL control signal superimposed with the encoded signal is adjusted, as indicated in the bottom half of (b) in FIG. 6A.

In this way, the second controller 180 turns off the backlight 190 even after the blanking period B1 until before the start of the encoded signal period C1 in accordance with the adjusted BL control signal, and further turns off the backlight 190 until a period from the adjustment period minus the period from P2 to P3, during the encoded signal period C1 and after the end of the encoded signal period C1.

Note that when the adjustment period is shorter than the period from P2 to P3, the adjustment period may be established between P2 and P3 only. Moreover, when P2=P3, the entire adjustment period may be established after the end of the encoded signal period C.

(Adjustment Method for when Encoded Signal Period and Blanking Period do not Overlap (Case 2))

FIG. 6B illustrates an example where the adjustment period is 0 or greater and (adjustment period+encoded signal period+blanking period) is longer than the length of one frame.

As illustrated in the top half of (c) in FIG. 6B, part of the adjustment period starts at the end time P2 of blanking period B1 and ends at the start time P3 of the encoded signal period C1, and the remaining part of the adjustment period goes back from the end time P4 of one frame.

As a result of the second processor 170 establishing the adjustment period indicated in the top half of (c) in FIG. 6B, the BL control signal superimposed with the encoded signal is adjusted, as indicated in the bottom half of (c) in FIG. 6B.

In this way, the second controller 180 turns off the backlight 190 after the blanking period B1 until the start time P3 of the encoded signal period C1 in accordance with the adjusted BL control signal, and turns off the backlight 190 from time P5 before the end of the encoded signal period C1 until time P4. In other words, during the period from time P5, which overlaps with the remaining adjustment period and the encoded signal period C1, to the end time P10 of encoded signal period C1, the encoded signal is not superimposed on the adjusted BL control signal (or the signal is set to OFF) so as not to transmit the encoded signal.

Note that when P2=P3 (i.e., they are the same point in time), the entire adjustment period may be established after the encoded signal period.

(Adjustment Method for when Encoded Signal Period and Blanking Period do not Overlap (Case 3))

Figure 6C:
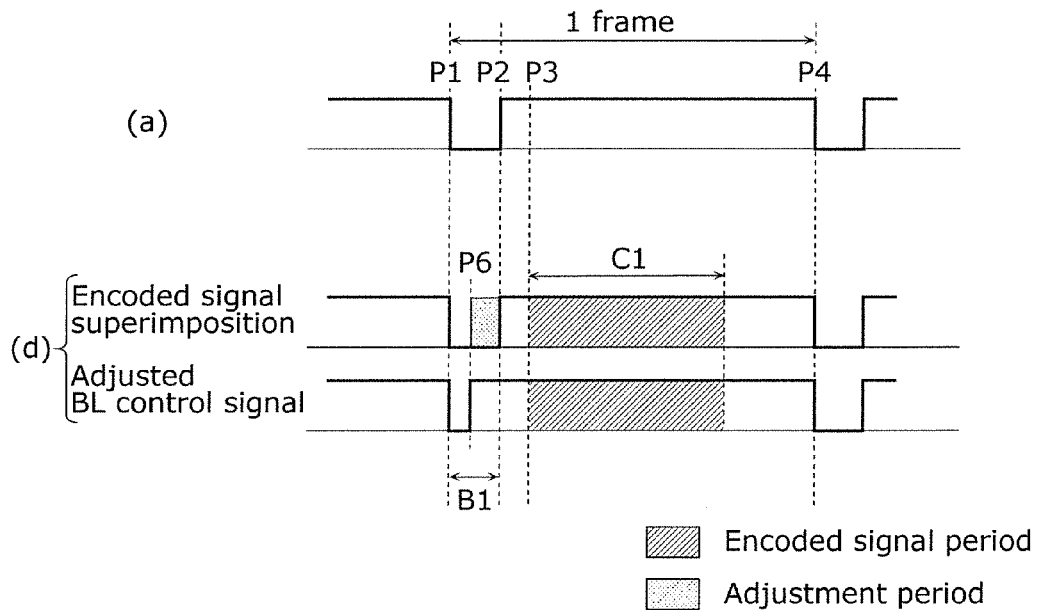
FIG. 6C is a timing chart illustrating the second method according to Example 2 of Embodiment 1.

FIG. 6C illustrates an example where the adjustment period is less than 0 and (adjustment period+encoded signal period+blanking period) is shorter than or equal to the length of one frame. Here, an adjustment period less than 0 means an adjustment period during which the backlight 190 is turned on.

As illustrated in the top half of (d) in FIG. 6C, the adjustment period is located from the end time P2 of the blanking period B1 counting back by an amount of time corresponding to the absolute value of the adjustment period (i.e., the adjustment period is between time P6 and time P2).

As a result of the second processor 170 establishing the adjustment period indicated in the top half of (d) in FIG. 6C, the BL control signal superimposed with the encoded signal is adjusted, as indicated in the bottom half of (d) in FIG. 6C.

In this way, the second controller 180 turns on the backlight 190 during the period from time P6 during the blanking period B1 until time P2, based on the adjusted BL control signal.

Moreover, when P2=P3, the entire adjustment period may be established after the encoded signal period C1. Moreover, when the adjustment period is longer than the blanking period, taking into consideration the duty cycle of the encoded signal, the OFF period may be set counting back from the end time of the encoded signal period C1 until an amount of on-time required to supply the deficiency can be secured, without superimposing the encoded signal.

(Adjustment Method for when Encoded Signal Period and Blanking Period do not Overlap (Case 4))

Figure 6D:
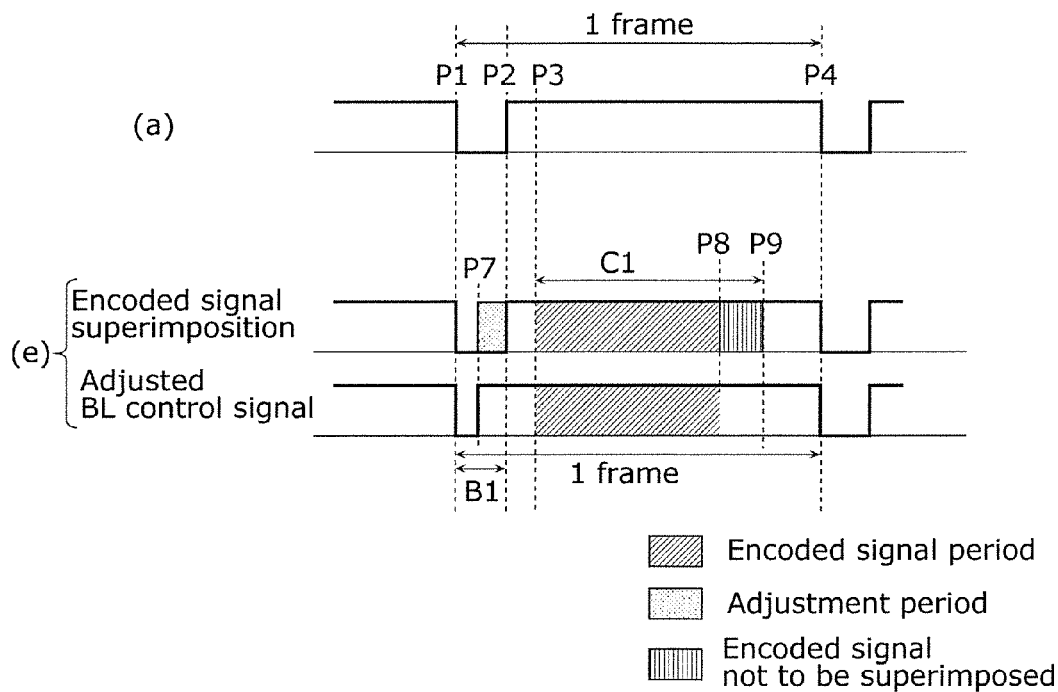
FIG. 6D is a timing chart illustrating the second method according to Example 2 of Embodiment 1.

FIG. 6D illustrates an example where the adjustment period is less than 0 and (adjustment period+encoded signal period+blanking period) is longer than the length of one frame.

As illustrated in the top half of (e) in FIG. 6D, the adjustment period is located from the end time P2 of the blanking period B1 counting back by an amount of time corresponding to the absolute value of the adjustment period (i.e., the adjustment period is between time P7 and time P2). With this, the backlight 190 is turned on during the period from time P7 to time P2 in the blanking period B1.

Note that regardless of the fact that the blanking period and the encoded signal period do not overlap and that the adjustment period is negative, there are instance where the absolute value of the adjustment period may be longer than the blanking period. In this case, when the entire adjustment period is located based on time P2 at the end of the blanking period B1, time P7 is equal to or ahead of time P1, whereby the blanking period is no longer present. When not all are to be turned on during the blanking period and still some regions require the backlight 190 to be turned on (some regions are required to be brightened), the backlight may be turned on during the OFF period of the encoded signal of the encoded signal period as the period remaining after excluding the blanking period portion of the adjustment period. In other words, the remaining adjustment period may be located from time P9 counting back (until time P8), and superimposition of the encoded signal may be skipped and turning-on of the backlight may be continued.

Here, time P8 needs to be determined because blanking period B1 is equal to the total OFF period during a period obtained by subtracting the period between time P8 and time P9 from the encoded signal period C1. More specifically, time P8 can be calculated based on the relationship: blanking period B1=(encoded signal period C1−(time P9−time P8))×(1−Duty).

With this, the second processor 170 can adjust the BL control signal such that the second controller 180 causes the backlight 190 to continue being on from time P8 to the start of the next blanking period in addition to during the blanking period B1.

Note that when P2=P3, the entire adjustment period may be located after the encoded signal period C1.

Next, with reference to FIG. 7A through FIG. 7D, operations performed by the second processor 170 with respect to establishing an adjustment period according to the second method when the encoded signal period and the blanking period overlap will be described.

In FIG. 7A through FIG. 7D, the top half, as indicated by (a), illustrates the BL control signal before superimposition of the encoded signal, and the bottom half, as indicated by (b) through (e), indicates the (i) BL control signal after superimposition of the encoded signal and (ii) the BL control signal adjusted in accordance with the second method. In these figures, the blanking period is indicated as B1, the encoded signal period is indicated as C1, and the period from time Q1 to time Q6 is one frame.

The method of adjusting the BL control signal superimposed with the encoded signal in accordance with the second method is separated into four different cases illustrated in FIG. 7A through FIG. 7D based on the relationship between (i) a sum of the adjustment period, the encoded signal period, and the blanking period and (ii) whether the adjustment period is positive or negative. Hereinafter, each case will be described.

(Adjustment Method for when Encoded Signal Period and Blanking Period Overlap (Case 1))

Figure 7A:
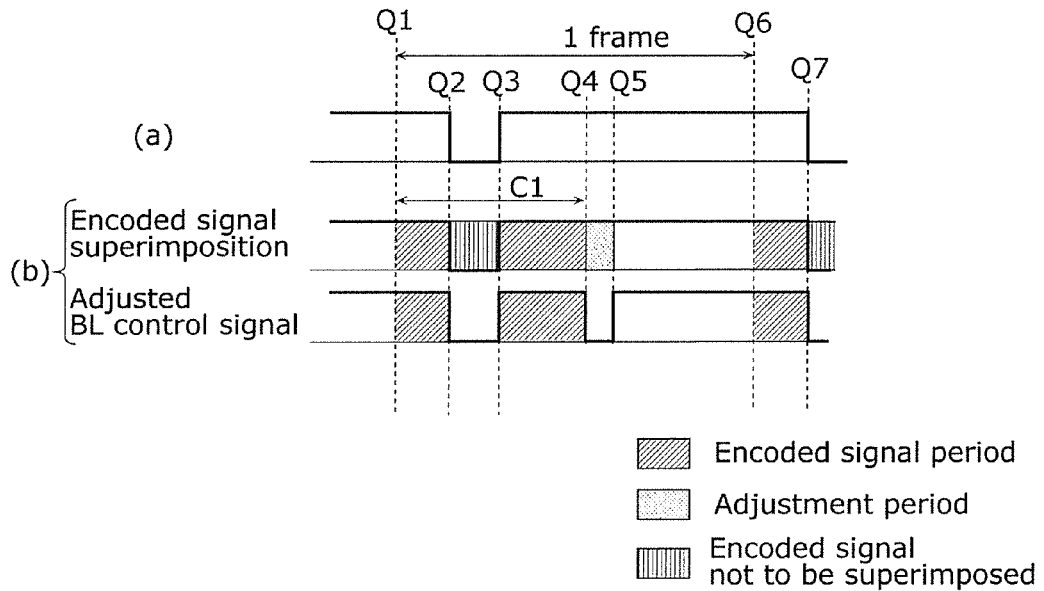
FIG. 7A is a timing chart illustrating the second method according to Example 2 of Embodiment 1.

FIG. 7A illustrates an example where the adjustment period is 0 or greater and (adjustment period+encoded signal period+blanking period) is shorter than or equal to the length of one frame.

As indicated by the top half of (b) in FIG. 7A, the adjustment period is located based on the end time Q4 of the encoded signal period C1.

As a result of the second processor 170 establishing the adjustment period indicated in the top half of (b) in FIG. 6A, the BL control signal is adjusted so as to not be superimposed with the encoded signal during the period from time Q4 to time Q5, which is the adjustment period, and the period from time Q2 to time Q3, which overlaps with the blanking period B1, as indicated in the bottom half of (b) in FIG. 7A.

In this way, the second controller 180 turns off the backlight 190 during the period from time Q2 to time Q3, which overlaps with the blanking period B1, and during the period from time Q4 to time Q5 in accordance with the adjusted BL control signal. Note that during the period from time Q4 to time Q5, the backlight 190 is turned off and encoded signals are not transmitted.

(Adjustment Method for when Encoded Signal Period and Blanking Period Overlap (Case 2))

Figure 7B:
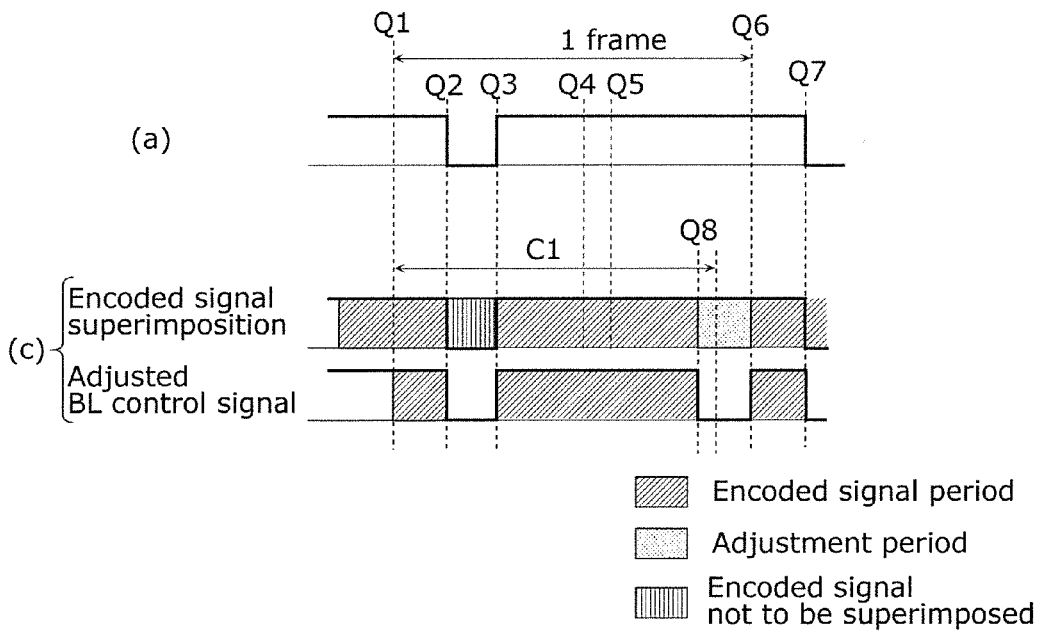
FIG. 7B is a timing chart illustrating the second method according to Example 2 of Embodiment 1.

FIG. 7B illustrates an example where the adjustment period is 0 or greater and (adjustment period+encoded signal period+blanking period) is longer than or equal to the length of one frame.

As indicated in the top half of (c) in FIG. 7B, based on the start time Q6 of the encoded signal for the next frame and counting backwards, the adjustment period is located between time Q8 and time Q6, which is the adjustment period.

As a result of the second processor 170 establishing the adjustment period indicated in the top half of (c) in FIG. 7B, the BL control signal is adjusted so as to not be superimposed with the encoded signal during the period from time Q8 to time Q6, which is the adjustment period, and the period from time Q2 to time Q3, which overlaps with the blanking period B1, as indicated in the bottom half of (c) in FIG. 7B.

In this way, the second controller 180 turns off the backlight 190 during the period from time Q2 to time Q3, which overlaps with the blanking period B1, and during the period from time Q8 to time Q6 in accordance with the adjusted BL control signal. Note that during the period from time Q8 to time Q6, the backlight 190 is turned off and encoded signals are not transmitted.

(Adjustment Method for when Encoded Signal Period and Blanking Period Overlap (Case 3))

FIG. 7C illustrates an example where the adjustment period is less than 0 and (adjustment period+encoded signal period+blanking period) is longer than or equal to the length of one frame.

As illustrated in the top half of (d) in FIG. 7C, the adjustment period is located from the end time Q3 of the blanking period B1 counting back by an amount of time corresponding to the absolute value of the adjustment period.

As a result of the second processor 170 establishing the adjustment period indicated in the top half of (d) in FIG. 7C, the BL control signal is adjusted such that the backlight 190 turns on during the period from time Q9 to time Q3, which is the adjustment period, and adjusted so as to not be superimposed with the encoded signal during the blanking period B1, as indicated in the bottom half of (d) in FIG. 7C.

In this way, the second controller 180 turns on the backlight 190 during the period from time Q9 until time Q3, in accordance with the adjusted BL control signal.

Note that the encoded signal may be superimposed during the adjustment period. In this case, the adjustment period may be elongated by the total encoded signal OFF period. Furthermore, when the adjustment period is longer than the blanking period, based on the duty cycle of the encoded signal, the deficient on-time during the adjustment period can be supplemented by turning on the backlight 190 without superimposing the encoded signal during a predetermined period counting back from the end time of the encoded signal period C1.

(Adjustment Method for when Encoded Signal Period and Blanking Period Overlap (Case 4))

FIG. 7D illustrates an example where the adjustment period is less than 0 and (adjustment period+encoded signal period+blanking period) is longer than the length of one frame.

As illustrated in the top half of (e) in FIG. 7D, the adjustment period is located from the end time Q3 of the blanking period B1 counting back by an amount of time corresponding to the absolute value of the adjustment period until time Q10.

With this, the backlight 190 is turned on during the period from time Q10 to time Q3 overlapping with the blanking period B1.

Note that the adjustment period may be elongated by the encoded signal total OFF period, and the encoded signal may be superimposed during the adjustment period.

Moreover, similar to (e) in FIG. 6D, when the adjustment period is substantially long and the absolute value thereof is greater than that of the blanking period B1, the backlight may be turned on during the OFF period of the encoded signal of the encoded signal period as the period remaining after excluding the blanking period B1 portion of the adjustment period.

Here, time Q11 needs to be determined because the original blanking period B1 is equal to the total OFF period during a period obtained by subtracting the period between time Q11 and time Q12 from the encoded signal period C1. More specifically, time Q11 can be calculated based on the relationship: blanking period B1=(encoded signal period C1−(time Q12−time Q11))×(1−Duty).

With this, the second processor 170 can adjust the BL control signal such that the second controller 180 causes the backlight 190 to continue being on from time Q11 to the start time Q7 of the next blanking period in addition to during the blanking period B1.

2.2.3 Advantageous Effects, Etc

As described above, with Example 2 of Embodiment 1, backlight control methods for improving video characteristics such as backlight scanning and transmission of visible light communication signals using the backlight can both be achieved by performing adjustment that equalizes the OFF periods by the visual light communication encoded signals or reverts the OFF period to that of the original image signal.

Here, for example, in the display device according to Example 2 of Embodiment 1, when superimposing the visible light communication signals on the backlight control signals, if the regions include a region whose backlight control signal indicates an OFF state of the backlight in a period that overlaps a period of the visible light communication signal being superimposed, the signal processor (the second processor 170) may establish a ON adjustment period for the region with overlapping periods and adjust ON/OFF of the backlight control signal during the ON adjustment period, the ON adjustment period being for adjusting brightness of the region with overlapping periods.

With this, by establishing the adjustment period in a region in which the visible light communication signal period and the backlight OFF period overlap, when the visible light communication signals (encoded signals) are superimposed on the BL control signals, differences in brightness across the display region are less perceivable.

Note that in Example 2 of Embodiment 1, the reference region is described as a "bright" region, but this may be interpreted as a region in which the aperture of the display panel 150 is set to a large value.

Example 3 of Embodiment 1

2.3.1 One Example of Operations Performed by Second Processor in Accordance with Second Method In Example 2 of Embodiment 1, the brightness of the display screen 110 (display region) of the display panel 150 is equalized by establishing an adjustment period during which the backlight 190 is either turned on or off, but this is merely one example.

In Example 3 of Embodiment 1, a method with which an adjustment period is not established will be described with reference to FIG. 8.

Figure 8:
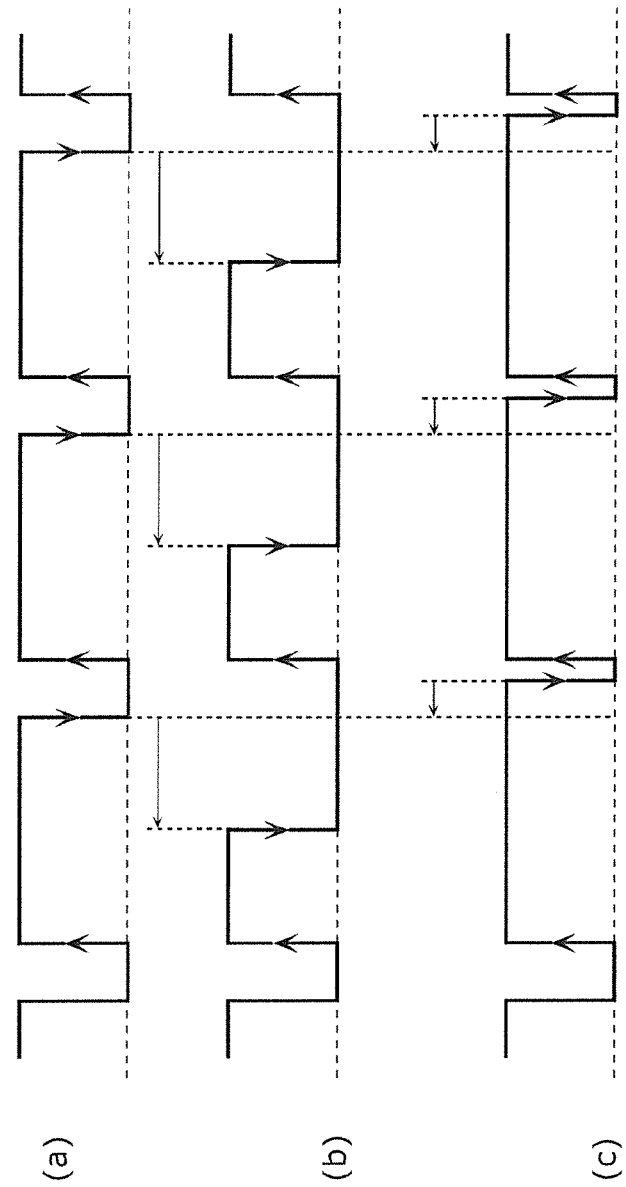
FIG. 8 is a timing chart illustrating a method according to Example 3 of Embodiment 1 of superimposing visible light communication signals on BL control signals.

FIG. 8 is a timing chart illustrating a method according to Example 3 of Embodiment 1 of superimposing visible light communication signals on BL control signals. Here, in (a) in FIG. 8, the BL control signal for a predetermined region is shown. Note that in Example 3 of Embodiment 1, signal detection is performed only with rising waveform signals.

As illustrated in FIG. 8, without establishing an adjustment period, the duty cycle of the visible light communication signal for only the portion corresponding to the adjustment period—i.e., the high period of the signal—may be varied to adjust the brightness of the region.

More specifically, for example, when the adjustment period in Example 2 of Embodiment 1 is positive—i.e., when the adjustment turns off the backlight 190—the high period of the BL control signal may be shortened as illustrated in (b) in FIG. 8.

More specifically, for example, when the adjustment period in Example 2 of Embodiment 1 is negative—i.e., when the adjustment turns on the backlight 190—the high period of the BL control signal may be lengthened as illustrated in (c) in FIG. 8.

Note that varying the duty cycle of the BL control signal for each region in the display region is also conceivable. In this case, in order to drive the BL control signals at a constant duty cycle in the screen, a mixture of the adjustment period in Example 2 of Embodiment 1 recalculated to include the duty cycle variation and the method of varying the high period of the visible light communication signals according to Example 3 of Embodiment 1 may be used.

Furthermore, in the above description, a uniform brightness across the screen and prevention of a decrease in image quality are achieved by performing brightness control utilizing control (PWM (pulse width modification) control) of the high period of the backlight 190, but this is merely an example. The second controller 180 that controls the backlight may approximate the brightness of the visible light communication regions to the brightness of the other regions by controlling the current supplied to the backlight 190 of each region. Furthermore, the brightness of the visible light communication regions may be approximated to the brightness of the other regions with a combination of the PWM control of the backlight 190 and the electrical current control.

2.3.2 Advantageous Effects, Etc

As described above, with Example 3 of Embodiment 1, backlight control methods for improving video characteristics relating to backlight scanning and transmission of visible light communication signals using the backlight can both be achieved by performing adjustment that equalizes the OFF periods by the visual light communication encoded signals or reverts the OFF period to that of the original image signal.

Note that in Example 3 of Embodiment 1, it is described that signal detection is performed only with rising signals, but this is merely an example. When the BL control signal maintains the position of the fall of the waveform and changes the position of the rise of the waveform, signal detection may be performed with a falling signal. In Example 3 of Embodiment 1, the encoded signals are superimposed using the rise of the BL control signals as a reference, but the timing at which the encoded signals are superimposed may be based on other characteristics of the BL control signals such as the fall of the BL control signals, and may be based on a synchronization signal of the image signal itself. Moreover, a signal of the synchronization signal of the image delayed by a certain amount of time may be generated, and that signal may be used as a reference.

(3. Advantageous Effects)

Embodiment 1 provides a display device capable of outputting visible light communication signals without significantly deteriorating the quality of the display image, and capable of reducing receiving error of output visible light communication signals.

Embodiment 2

In Embodiment 1, operations performed by the display device 100 when the encoded signal period is shorter than the BL control signal ON period are described. In Embodiment 2, operations performed by the display device 100 when the encoded signal period is longer than the BL control signal ON period will be described.

(1. Display Device Operations)

The following description will focus on operations performed by the second processor 170.

FIG. 9 is a flow chart illustrating operations performed by the second processor according to Embodiment 2.

First, in step S801, the second processor 170 re-encodes the visible light communication signal. More specifically, after the second processor 170 encodes the visible light communication signal, the second processor 170 generates (re-encodes) the encoded signal added with a header, for example. Moreover, the second processor 170 calculates the transmission time for the encoded signal based on the carrier frequency of the encoded signal.

Next, in step S802, the second processor 170 determines whether the length of the encoded signal is greater than the BL control signal ON period (the time during which the backlight is turned on, i.e., the ON duration).

More specifically, the second processor 170 compares the time during which the backlight 190 is turned on (the ON duration) based on the BL control signal duty cycle calculated by the first processor 130 against the transmission time for the encoded signal (encoded signal length). When the second processor 170 determines that the transmission time for the encoded signal is shorter (No in S802), the process proceeds to step S806, and when the second processor 170 determines that the transmission time for the encoded signal is longer (Yes in S802), the process proceeds to step S803.

Next, in step S803, the second processor 170 determines whether to perform visible light communication. When the second processor 170 determines to perform visible light communication (Yes in S803), the process proceeds to step S804, and when the second processor 170 determines to not perform visible light communication (No in S803), the process proceeds to step S809.

Next, in step S804, the second processor 170 re-encodes the visible light communication signal. More specifically, the second processor 170 generates the signal (re-encodes the visible light communication signal) such that the signal duty cycle of the header is for the most part OFF when the signal is encoded with a signal array such that it is inconceivable that the data in the header is the payload. Next, the second processor 170 advances the encoded signal transmission start time such that the timing of the rise of the BL control signal matches the final signal in the header (the signal indicating an ON state at the final edge of the header). Note that further detailed description is omitted.

Next, in step S805, the second processor 170 determines whether the length of the encoded signal is greater than the BL control signal ON period (the ON duration).

More specifically, the second processor 170 compares the ON duration of the backlight 190 based on the BL control signal duty cycle against the encoded signal transmission time. Then, when the second processor 170 determines that the encoded signal transmission time is shorter (No in S805), the process proceeds to step S806, and when the second processor 170 determines that the encoded signal transmission time is longer (Yes in S805), the process proceeds to step S807.

Here, in step S806, the second processor 170 superimposes the encoded signal on the part of the BL control signal other than the blanking period part (in other words, the ON period of the BL control signal, outputs it to second controller 180, and ends the process.

On the other hand, in step S807, the second processor 170 determines whether to divide the encoded signal. More specifically, the second processor 170 compares the transmission time of the re-encoded encoded signal against the ON duration of the backlight 190. Then, when the encoded signal transmission time is longer, the second processor 170 determines to divide the encoded signal (Yes in S807) and proceeds to step S808, and when the encoded signal transmission time is shorter, the second processor 170 determines to not divide the encoded signal (No in S807) and proceeds to step S809.

Next, in step S808, the second processor 170 divides the encoded signal to achieve a data length that fits in the ON duration of the backlight. The second processor 170 then adjusts the encoded signal such that the encoded signal is superimposed on a part of the backlight control signal other than the blanking period (i.e., the BL control signal ON period), and ends the process.

Note that in step S809, the second processor 170 does not transmit the encoded signal to the second controller 180. In other words, transmission of the visible light communication signal is cancelled.

(2. Operation Details)

Hereinafter, details regarding (i.e., a specific example of) operations performed by the display device 100 according to Embodiment 2 will be described with reference to FIG. 10A through FIG. 10D and FIG. 11.

2.1. Specific Example 1

FIG. 10A through FIG. 10D illustrate a specific method for superimposing encoded signals on BL control signals according to Embodiment 2.

In Embodiment 2, the second processor 170 encodes visible light communication signal using an encoding method such as 4 PPM or inverted-4 PPM. Significant variations in brightness due to the signal can be relatively mitigated by encoding using 4 PPM or inverted-4 PPM, making it possible to avoid instability in brightness. Note that the visible light communication signals may be encoded using, for example, Manchester encoding.

Figure 10A:
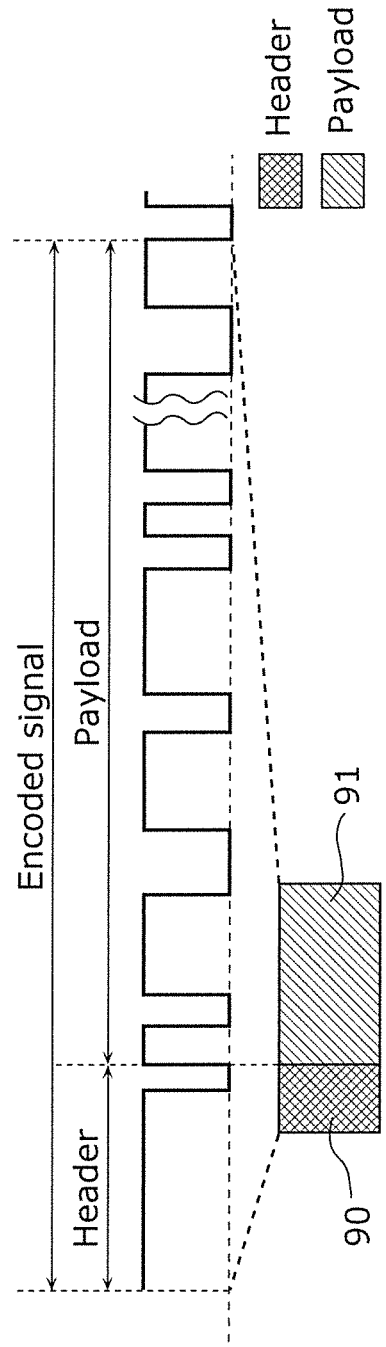
FIG. 10A illustrates a specific method for superimposing encoded signals on BL control signals according to Embodiment 2.

For example, as illustrated in FIG. 10A, the encoded signal includes a header 90 and a payload 91 in which code, for example, is stored. The header 90 is assumed to include a signal array inconceivable for data signals. Here, when encoding using inverse-4 PPM, in principle, the high period accounts for 75% of the signal period. Moreover, ON states are generally input into the header in three continuous slots or more (three slots being the smallest unit of the encoded signal). The header also generally ends in an OFF state at the separation point of the header.

FIG. 10B illustrates a case where the encoded signal period is shorter than the BL control signal ON period. In other words, as illustrated in FIG. 10B, when the entire encoded signal including the header is shorter than the period excluding the blanking period in one frame of the BL control signal (i.e., the BL control signal ON period), the encoded signal can be superimposed in the BL control signal ON period with no problem.

However, when the encoded signal period is longer than the BL control signal ON period, the entire encoded signal including the header cannot be included in the BL control signal ON period, so the encoded signal is divided and included in the BL control signal ON period, as described above with regard to step S807.

Figure 10C:
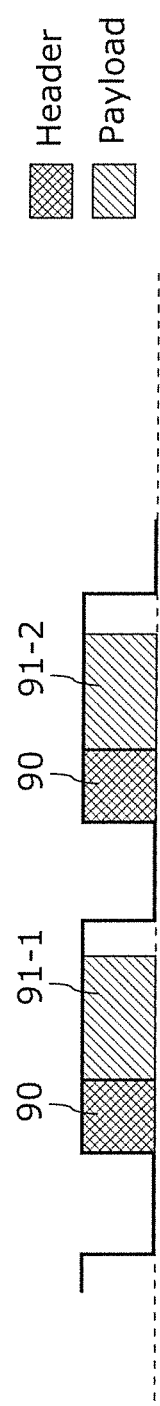
FIG. 10C illustrates a specific method for superimposing encoded signals on BL control signals according to Embodiment 2.

FIG. 10C illustrates an example of when the encoded signal is divided and superimposed in the BL control signal ON period due to the entire encoded signal including the header exceeding the length of one frame of the BL control signal. More specifically, the payload 91 of the encoded signal is divided into a payload 91-1 and a payload 91-2, included with a header 90 and a header 92, and superimposed in the BL control signal ON period. The header 92 includes a discriminant signal indicating that the payload 91-2 is divided from payload 91 and the payload 91-2 follows the payload 91-1.

Note that when the encoded signal period is longer than the BL control signal ON period, only the header 90 may be superimposed in the BL control signal blanking period and the payload 91 may be superimposed in the BL control signal ON period, as illustrated in FIG. 10D.

2.2. Specific Example 2

Next, an aspect different from that shown in FIG. 10D will be described. More specifically, a specific example where only the header of the encoded signal is superimposed in the BL control signal blanking period if the encoded signal period is longer than the BL control signal ON period will be described.

Figure 11:
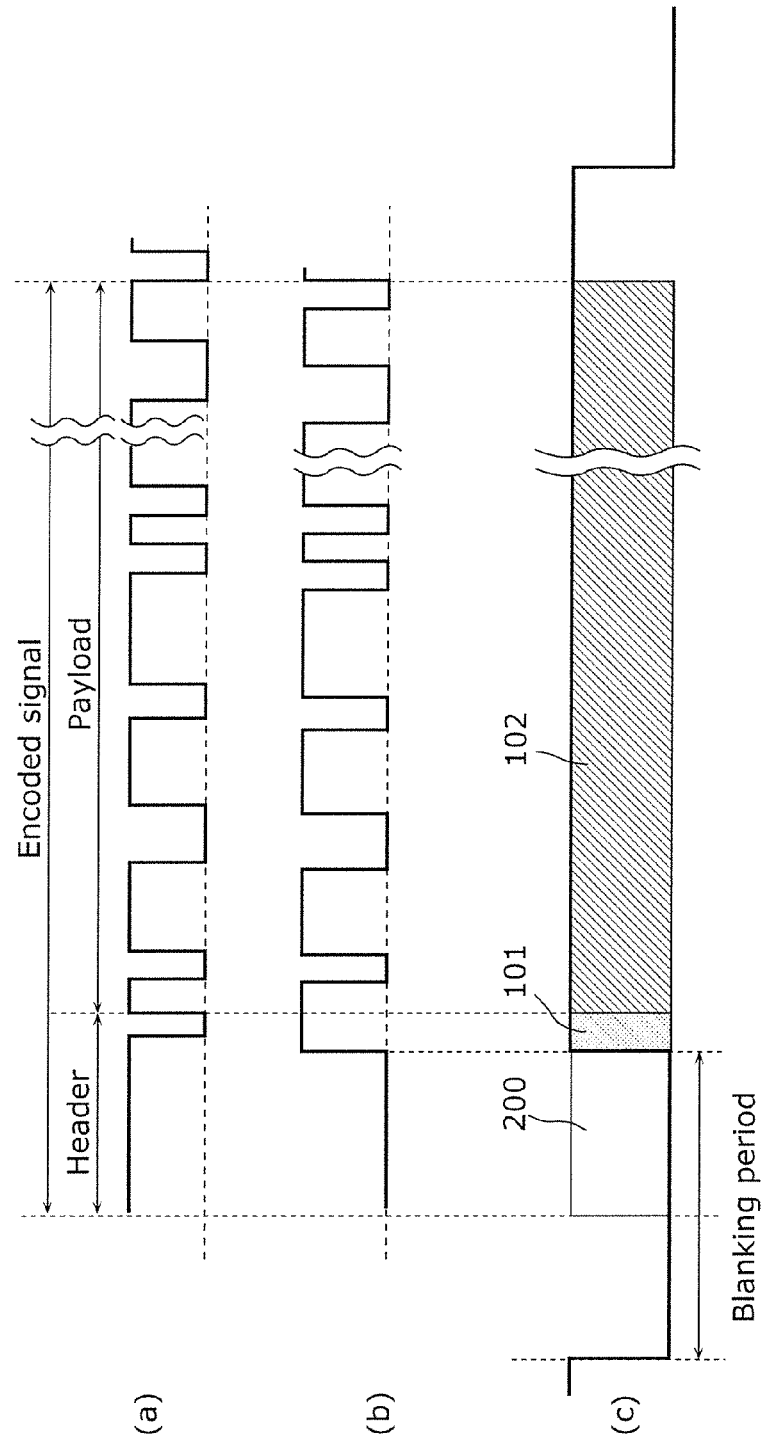
FIG. 11 illustrates a different specific method for superimposing encoded signals on BL control signals according to Embodiment 2.

FIG. 11 illustrates a specific method for superimposing encoded signals on BL control signals according to Embodiment 2.

(a) in FIG. 11 illustrates an encoded signal encoded using inverse-4PRM.

As illustrated in (b) in FIG. 11, the header from (a) in FIG. 11 may be re-encoded using 4 PPM instead of inverse-4 PPM. In this case, as illustrated in (b) in FIG. 11, the header has been changed from an ON state leading into an OFF state to an OFF state leading into an ON state.

Then, as illustrated in (c) in FIG. 11, the encoded signal illustrated in (b) in FIG. 11 is superimposed on the BL control signal. In the example illustrated in (c) in FIG. 11, an encoded signal including the header 200, which is a signal of an OFF state, the header 101, which is a signal of an ON state, and the payload 102 is superimposed on the BL control signal.

More specifically, the second processor 170 encodes the visible light communication signals to generate encoded signals and superimposes the encoded signals, as the visible light communication signals, on the backlight control signals, and when superimposing the encoded signals on the backlight control signals, if the regions include a region whose backlight control signal indicates an OFF state of the backlight in a period that overlaps a period of the encoded signal being superimposed, a header portion of the encoded signal is superimposed on the backlight control signal during the period indicating an OFF state of the backlight 190, and a portion of the encoded signal other than the header portion is superimposed on the backlight control signal during a period other than the period indicating an OFF state of the backlight.

With this, even when the encoded signal period is longer than the BL control signal ON period, the payload of the encoded signal can be superimposed in the BL control signal ON period.

In other words, for example, as illustrated in (c) in FIG. 11, by superimposing the header 200, which is a signal of an OFF state, during the BL control signal blanking period, the encoding time can be reduced.

Note that when the adjustment period described in Embodiment 1 is established, a period during which the header 90 of the encoded signal illustrated in, for example, FIG. 10D is superimposed in the BL control signal blanking period and the backlight is turned on during the blanking period needs to be subtracted from the adjustment period.

However, as illustrated in (c) in FIG. 11, for example, when the end time of the header 200 of the encoded signal (the point in time of the final ON state) is synchronized with the end time of the blanking period and the phase is determined, the backlight is not turned on during the blanking period, so there is no need to subtract from the adjustment period.

(3. Advantageous Effects, Etc.)

Embodiment 2 provides a display device capable of outputting visible light communication signals without significantly deteriorating the quality of the display image, and capable of reducing receiving error of output visible light communication signals.

Note that in Embodiment 2, an example of using the header of the encoded signal encoded using a typical 4 PPM encoding method is given, but this is merely an example. For example, when the average duty cycle of the header of the encoded signal is high, a header in which the ON signals and OFF signals have been reversed may be superimposed in the blanking period. In this case, as previously described, adjustment in which the decrease in the OFF period of the blanking period is inserted into the adjustment period is preferable.

Moreover, when the entire encoded signal including the header can be superimposed in the BL control signal ON period (i.e., in the ON duration of the backlight 190), encoding may be performed such that the duty cycle of the header increases.

Moreover, even when the header is superimposed in the blanking period, there are cases when the header will not fit in the blanking period due to the length of the blanking period. In this case, different types of headers may be prepared and used in accordance with the length of the blanking period.

Embodiment 3

In Embodiment 3, a method of dividing the plurality of regions of the display region into groups and superimposing the encoded signal so that it is possible to superimpose the entire encoded signal period of the encoded signal in the BL control signal ON period will be described.

(1. Second Processor Operations)

Hereinafter, an example will be given of a method of determining a time at which to superimpose the encoded signal about the brightest region, based on region brightness.

Figure 12:
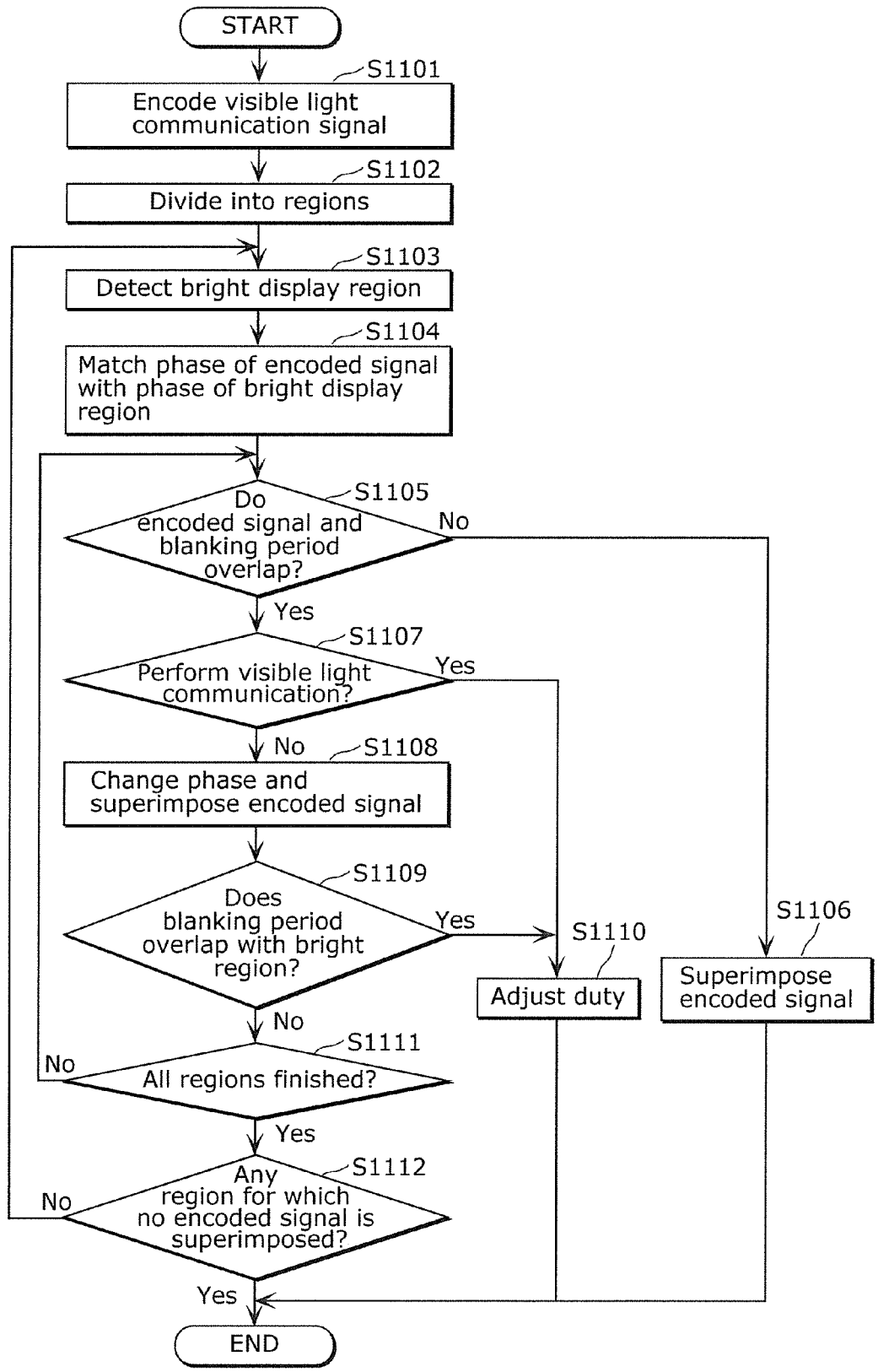
FIG. 12 is a flow chart illustrating operations performed by the second processor according to Embodiment 3.

FIG. 12 is a flow chart illustrating operations performed by the second processor according to Embodiment 3.

First, in step S1101, the second processor 170 encodes the visible light communication signal. More specifically, after the second processor 170 encodes the visible light communication signal, the second processor 170 generates the encoded signal added with a header, for example. Moreover, the second processor 170 calculates the transmission time for the encoded signal based on the carrier frequency of the encoded signal.

Next, in step S1102, the second processor 170 divides the display region into a plurality of regions.

Next, in step S1103, the second processor 170 detects a bright region with respect to display. More specifically, the second processor 170 detects the brightness of each of the regions, and based on the result, selects the brightest region with respect to display. Here, brightness with respect to display means the brightest place with respect to signal level indicating light emission energy of the image, and not a place where the BL control signal duty cycle is large. Detection of the bright location will be described in detail later.

Next, in step S1104, the second processor 170 matches the phase of the encoded signal to that of the bright region with respect to display. More specifically, the second processor 170 superimposes an in-phase encoded signal on a BL control signal corresponding to all regions in time with the BL control signal of the brightest region, or corresponding to a portion of selected regions (a plurality of selected regions).

However, similar to other embodiments, the encoded signal is not superimposed in the blanking period of the BL control signal. This is equivalent to operations of AND calculations for each BL control signal and the encoded signal. Note that steps S801 through S809 in FIG. 9 may be performed as necessary.

Next, in step S1105, the second processor 170 determines whether the encoded signal and the blanking period overlap. More specifically, the second processor 170 determines whether part of the encoded signal period and the blanking period of the BL control signal overlap on a per region basis, and when the encoded signal period and the blanking period of the BL control signal do not overlap (Yes in S1105), the process proceeds to step S1106, where the second processor 170 superimposes the encoded signal on the BL control signal and ends the processing. When there is an overlapping portion (No in S1105), the process proceeds to S1107.

In step S1107, the second processor 170 determines whether to perform visible light communication. When the second processor 170 determines to not perform visible light communication (No in S1107), the process proceeds to step S1108. When the second processor 170 determines to perform visible light communication (Yes in S1107), the process proceeds to step S1110, where the second processor 170 adjusts the duty cycle such that the encoded signal is not transmitted, and ends the processing.

Next, in step S1108, the second processor 170 changes the phase of the encoded signal, and superimposes the encoded signal with the changed phase on the BL control signal.

Next, in step S1109, the second processor 170 determines whether the blanking period overlaps a bright region or not. When the second processor 170 determines that the blanking period does not overlap a bright region (No in S1109), the process proceeds to step S1110. When the second processor 170 determines that the blanking period does overlap a bright region (Yes in S1109), the process proceeds to step S1111.

Next, in step S111, the second processor 170 determines whether processing has been performed for all regions. When the second processor 170 determines that processing has not been performed for all regions (No in S1111), the process returns to step S1105. When the second processor 170 determines that processing has been performed for all regions (Yes in S1111), the process proceeds to step S1112.

Next, in step S112, the second processor 170 determines whether there is a region for which no encoded signal has been superimposed. When the second processor 170 determines that there is no region for which no encoded signal has been superimposed (No in S1112), the process returns to step S1103. When the second processor 170 determines that there is a region for which no encoded signal has been superimposed (Yes in S1112), the process ends.

(2. Operation Details)

Next, details regarding (i.e., a specific example of) the display device 100 according to Embodiment 3 will be described with reference to FIG. 13 and FIG. 14.

Figure 13:
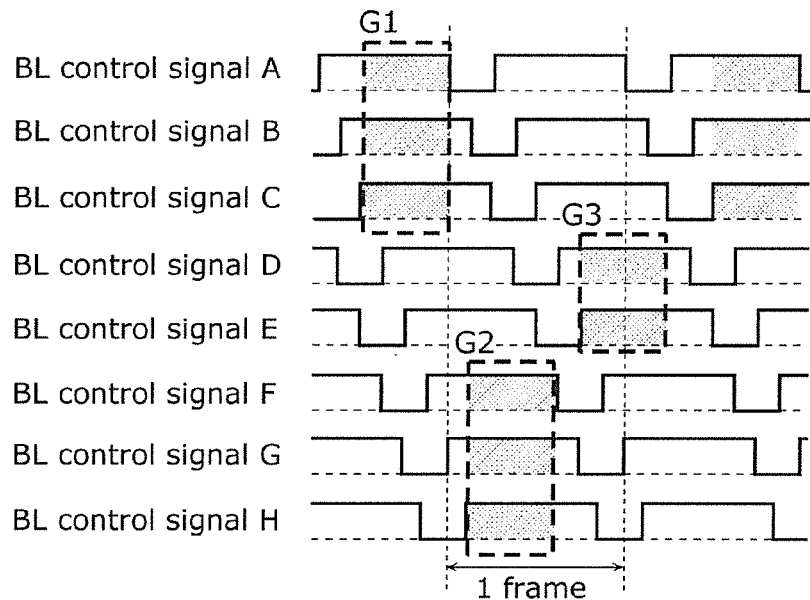
FIG. 13 is a timing chart of an example of the division of the regions into groups according to Embodiment 3.
Figure 14:
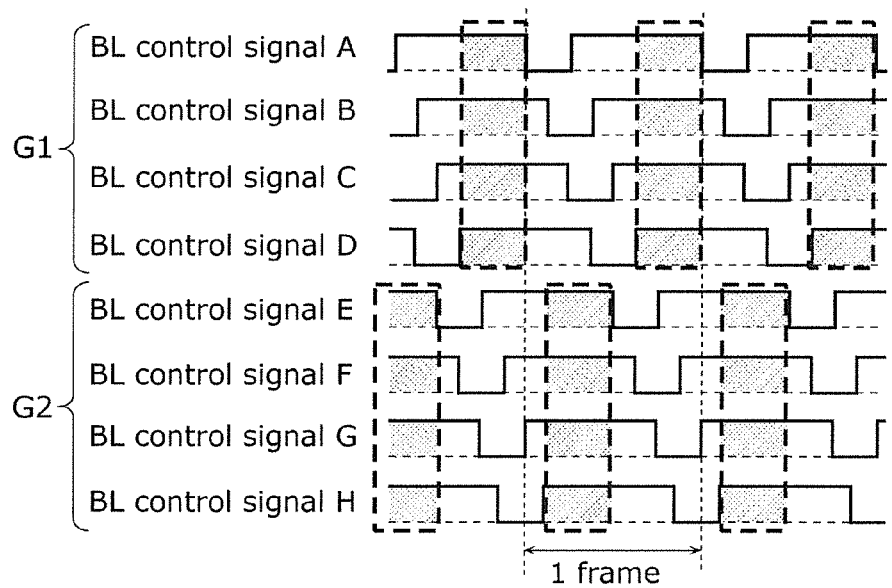
FIG. 14 is a timing chart of another example of the division of the regions into groups according to Embodiment 3.

FIG. 13 is a timing chart of one example of the division of the regions into groups according to Embodiment 3, and FIG. 14 is a timing chart of another example of the division of the regions into groups according to Embodiment 3. In FIG. 13 and FIG. 14, the shaded (hatched) portions indicate the periods in which the encoded signals are interposed (i.e., the encoded signal periods).

For example, as illustrated in FIG. 13, the regions of the display region are divided into three groups. More specifically, region A, region B, and region C are divided into group G1; region F, region G, and region H are divided into group G2; and region D and region E are divided into group G3. Then, as illustrated in FIG. 13, the encoded signals are superimposed in each group, at the same time in the same period. For example, in group G1, superimposition is performed using the brightest region—region C—as a reference, and in group G2, superimposition is performed using the brightest region—region E—as a reference.

Note that, as illustrated in FIG. 14, the regions of the display region may be divided into two groups. In other words, region A, region B, region C, and region D may be divided into group G1, and region E, region F, region G, and region H may be divided into group G2. Then, the encoded signals are superimposed in each group, at the same time in the same period.

(3. Advantageous Effects, Etc.)

In this way, with the display device according to Embodiment 3, the signal processor (the second processor 170) superimposes the visible light communication signals on the backlight control signals corresponding to groups of neighboring regions among the regions, the visible light communication signals superimposed on the backlight control signals in the same group are in phase with one another, and for each group, corresponding visible light communication signals are superimposed in entirety in a period during which control of light emission of the backlight (190) based on the backlight control signals corresponding to the groups is performed.

With this, since the display device can superimpose the entirety of the encoded signals for the encoded signal periods during the BL control signal ON periods, receiving error of output visible light communication signals can be reduced. Stated differently, since the visible light communication signals can be superimposed without loss of data in the BL control signal ON periods, receiving error of output visible light communication signals can be reduced.

Moreover, based on the backlight control signal corresponding to a predetermined region among the groups, the signal processor (the second processor 170) may match phases of the visible light communication signals superimposed on the backlight control signals corresponding to the groups.

With this, for each of the selected groups, the display device can output the visible light communication signal with less loss of data.

Here, the predetermined region is the brightest region among the regions.

With this, the display device 100 can make the difference in brightness across the display region less perceivable.

Moreover, among the visible light communication signals superimposed on the backlight control signal phases corresponding to the groups, a visible light communication signal superimposed on a backlight control signal corresponding to a first group among the groups and a visible light communication signal superimposed on a backlight control signal corresponding to a second group among the groups are out of phase.

With this, for each of the selected groups, the display device 100 can output the visible light communication signal with less loss of data.

Note that there are instances where the regions cannot be divided into groups, as described above. In other words, there are instances where there are regions in which in-phase encoded signals cannot fit even when the regions are divided into groups. Operations performed in this case are described hereinafter.

Figure 15:
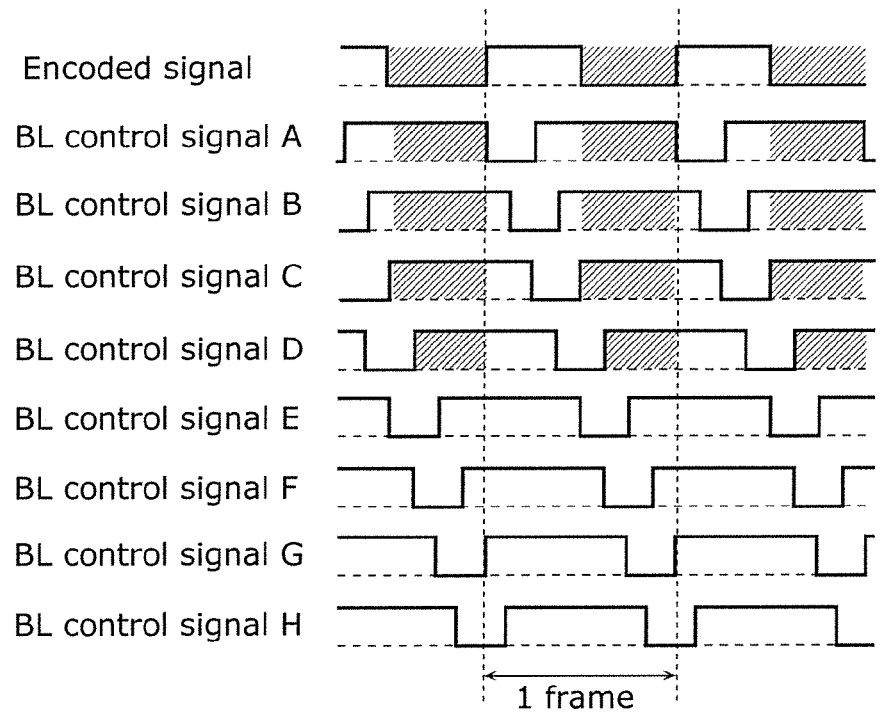
FIG. 15 is a timing chart of another example of the division of the regions into groups according to Embodiment 3.

FIG. 15 is a timing chart of another example of the division of the regions into groups according to Embodiment 3. In FIG. 15, the shaded (hatched) portions indicate the periods in which the encoded signals are interposed (i.e., the encoded signal periods).

For example, the example illustrated in FIG. 15 is a special example of FIG. 13 and FIG. 14. As illustrated in FIG. 15, after the regions have been divided into groups, when there is an in-phase encoded signal that cannot fit, transmission of the encoded signal may be cancelled.

More specifically, region A, region B, region C, and region D are divided into one group, and all other regions are divided into another group, and encoded signals in phase with one another are superimposed in region A, region B, region C, and region D. Here, in region D, the encoded signal is not superimposed in the overlapping period of the encoded signal and the blanking period. Furthermore, in the example illustrated in FIG. 15, encoded signals are not superimposed in the regions after region D (i.e., regions E through H).

Note that when there are regions in which in-phase encoded signals cannot fit even when the regions are divided into groups, a reference region may be designated, and the encoded signals may be superimposed only in regions surrounding the reference region (i.e., regions neighboring the reference region). In this case, the range of the superimposition of the encoded signals may be determined based on previously described flow charts, and may be limited to a predetermined range.

Moreover, the above-described adjustment period may be established to prevent brightness difference between regions in which the encoded signals are superimposed and regions in which the encoded signals are not superimposed, as well as within the region in which the encoded signals are superimposed.

Note that in Embodiment 3, the encoded signals are superimposed using the rise of the BL control signals as a reference, but the timing at which the encoded signals are superimposed may be based on other characteristics of the BL control signals such as the fall of the BL control signals, and may be based on a synchronization signal of the image signal itself. Moreover, a signal of the synchronization signal of the image delayed by a certain amount of time may be generated, and that signal may be used as a reference.

In all regions of the display region, searching for periods which are not blanking periods is very difficult, and even if there is such a period, it is significantly short. In the present disclosure, even when the encoded signals are superimposed on the BL control signal, by giving the blanking period as much priority as possible, loss of image quality is avoided by controlling the turning on of the backlight during the blanking period.

However, even if the blanking period and the encoded signal period do not overlap in a given region, most of the time there are other regions in which the blanking period and the encoded signal period do overlap.

As such, in Embodiment 3, a method is disclosed for avoiding overlapping of the blanking period and the encoded signal period in as many regions as possible among the regions of the display region. In other words, in Embodiment 3, the regions are divided into groups, and in each group, the encoded signals are superimposed at a given phase. With this, overlapping of the blanking period and the encoded signal in the groups can be reduced.

Note that in Embodiment 3, examples are given in which the groups are divided into two or three groups, but these are merely examples.

Moreover, regarding the method of dividing the regions into groups, the regions into a predetermined number of groups, and how the phase will be shifted, for example, may be set in advance.

Moreover, in Embodiment 3, the regions are divided into groups in such a manner that the length of the encoded signal (i.e., the entirety of the encoded signal period) can be superimposed based on the bright region, but this is merely an example. Since dividing the regions into groups based on this may yield a large number of groups, the number of groups may be limited. Regarding the division of the regions into groups, it is not necessarily required for the entirety of the encoded signal period to be superimposable.

Moreover, the encoded signals superimposed in the regions in each group may be the same or may be different. Note that when the encoded signal obtained on the receiver side is composed of two or more signals mixed together, the chance of a false recognition or error increases. Here, "two or more signals" means when different encoded signals are received by the same receiver at the same time, two or more of the same encoded signals that are out of phase are received by the same receiver at the same time, or a combination thereof. With this, the chance of a false recognition or error can be reduced.

Moreover, division of groups based on some reference is not limited to the example described above; the second processor 170 may divide the groups based on a signal processing result based on the relationship between the image signal and the encoded signal.

Moreover, with a backlight that uses, for example, LEDs, since the light sources are substantially small (nearly spots of light), in order to light up the screen like in a LCD, a light guide plate or a diffuser panel is used to spread the region. As such, when controlling the LEDs in each region, adjacent regions are designed to overlap one another, and leak light of a certain amount of more is present.

Thus, with a backlight that uses LEDs, for example, even when dividing the regions into groups, since a different signal bleeds in as noise from leak light from at least adjacent regions, there is a need to avoid encoded signals of regions including adjacent blocks temporally overlapping. As such, for example, encoded signals are not transmitted in that frame at that location, or temporally consecutive or overlapping encoded signals in a different region may be transmitted.

When encoded signals are not transmitted in that frame at that location, a region from which to output the encoded signal may be determined on a per frame basis. Alternatively, an encoded signal from a specified location (linked to the image signal) may be preferentially transmitted.

Moreover, when transmission periods of out of phase encoded signals from different regions overlap one another, this is acceptable so long as the regions are not continuous or a given period is between them. When limiting the region and receiving the signals, this is acceptable because the signals are receivable. Note that the period between out of phase regions must be determined based on the range of the light of the backlight leaking, and thus is a numerical value that changes depending on the characteristics of the display device used.

Moreover, each of the regions may be divided into blocks, and the above method may be applied to the blocks.

Embodiment 4

When using a light intensity sensor with a substantially fast response time, such as a photodiode, to receive the encoded signals, the phase difference between the image and the encoded signal is not very problematic.

However, when the encoded signal is imaged and obtained using an image sensor such as a smartphone or cellular phone camera or a digital still camera, due to a slight phase difference, the exposure timing and the ON-OFF edge of the signal or the timing of the start and/or the end of sequential encoded signal periods are off by a slight difference in time or occur at the same time, which can cause a useful signal to be unobtainable. In other words, since a typical imaging cycle for an image sensor is 30 FPS, when a 60 FPS image signal is synchronized with an encoded signal, for example, if the timing of the encoded signal cycle is not synchronized with the timing of the imaging by the image sensor, the timing of the imaging cycle and the encoded signal cycle will never match.

Thus, in Embodiment 4, in order to avoid the above, a method of shifting the phases of the encoded signals will be described.

(1. Display Device Operations)

The following description will focus on operations performed by the second processor 170.

Figure 16:
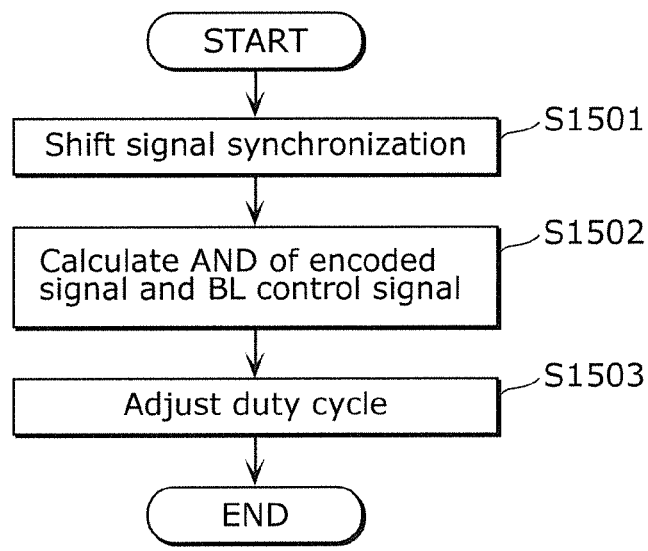
FIG. 16 is a flow chart illustrating operations performed by the second processor according to Embodiment 4.

FIG. 16 is a flow chart illustrating operations performed by the second processor according to Embodiment 4.

First, in step S1501, the second processor 170 shifts the synchronization of the signal. More specifically, the second processor 170 shifts the synchronization of the encoded signal when the synchronization of the display panel 150 and the backlight 190 is not fixed. This is effective in increasing the probability of successful imaging by the smartphone 200.

Next, in step S1502, the second processor 170 calculates the AND of the BL control signal and the encoded signal from the duty cycle based on the image signal output by the first processor 130.

Next, in step S1503, the second processor 170 adjusts the duty cycle based on at least one of the image signal and the visible light communication signal.

More specifically, the second processor 170 finds out whether the encoded signal period and the blanking period overlap one another and establishes an adjustment period accordingly, as described in Embodiment 1. When the duty cycle of the BL control signal for a frame is different from the duty cycle of the BL control signal based on the original image signal by an amount equivalent to the adjustment period, the second processor 170 adjusts the duty cycle using, for example, a period in which transmission of the encoded signal is stopped. Here, for example, the second processor 170 adjusts the duty cycle by setting the period during which the backlight 190 is turned off (the OFF period of the BL control signal) to a period other than the blanking period. Then, the second processor 170 outputs to the second controller 180 the BL control signal superimposed with the encoded signal adjusted by establishment of the adjustment period.

Note that when the phase relationship of the encoded signal and the image signal return to the original relationship after a certain period, the signals may be corrected to a predetermined phase difference.

Furthermore, so long as the phase of the encoded signal and the phase of the image signal change temporally at a frequency other than the frequency of the image signal—that is to say, one is not equal to approximately the integer multiple of the other—there is no particular need to perform phase matching control. This is because, even if the two phases are not matched in particular, after a certain amount of time passes, the relationship between both phases will return to the original state, whereby at some point in time there will be a time period in which signal reception is difficult and a time period in which signal reception can be done without complication.

FIG. 17A and FIG. 17B illustrate the relationship between the phases of the BL control signal and the visible light communication signal according to Embodiment 4.

For example, in FIG. 17A, using BL control signal X as a reference, it can be seen that the encoded signal based on the visible light communication signal and the BL control signal X become in-phase at a certain period. Note in FIG. 17A and FIG. 17B, the diagonal line portions indicate periods in which the encoded signal is actually transmitted, and as one example, the encoded signal is output at a longer cycle than the BL control signal and in shorter periods than the BL control signal, but the relationship between signal lengths is such that one is longer than the other, as previously described. Moreover, it is not required that one of the actual transmission period of the encoded signal and the length of the BL control signal is not long, but the encoded signal transmission period is preferably shorter than the BL control signal. Here, the encoded signal repeats 7 times in the period during which the BL control signal X repeats 12 times, and when the BL control signal is 60 fps, for example, both are in-phase at periods of 0.2 seconds. However, as illustrated in FIG. 17B, there is no particular correlation between the BL control signal X and the encoded signal, but the phase relationship between the start of the transmission period of the encoded signal and the start of a BL control signal per frame changes. For example f1 is located in the first half of a BL control signal, f2 is located at the second half of a BL control signal, and f3 is located roughly in the middle of a BL control signal. However, although the two have a least common multiple and the phase relationship will not return to the original state, since the phases gradually shift, error due to imaging timing can be avoided at somewhere along the line. Moreover, although the encoded signal is cut-off midway in region X at points f2, at which the encoded signal is transmitted in the period falling on the segue of the BL control signal, and f5, this is not a problem since the encoded signal can be transmitted in a different region without fail. The correlation between the video and the communication information is saved in a buffer, for example, and the previously written data is read, encoded as a communication signal and used. Moreover, when the time it takes for the phase relationship of both to return to the original relationship is substantially long (for example, a few seconds or longer), the phase relationship may be forcefully reset to the original relationship. For example, time is provided between the end of the encoded signal at f8 and f9 in FIG. 17B. The phases of the BL control signal and the encoded signal may or may not be resynchronized during this time. Moreover, the cycle for synchronizing them can be every one second, for example, or can be skipped.

(2. Operation Details)

Next, details regarding (i.e., a specific example of) operations performed by the display device 100 according to Embodiment 4 will be described with reference to FIG. 18A, FIG. 18B and FIG. 18C.

Figure 18A:
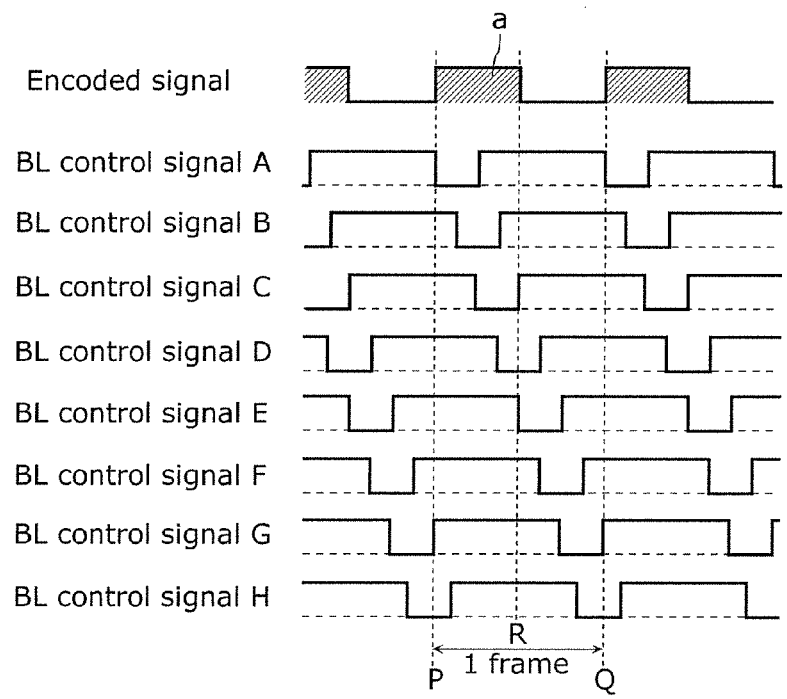
FIG. 18A is a timing chart illustrating operations performed by the second processor according to Embodiment 4.
Figure 18B:
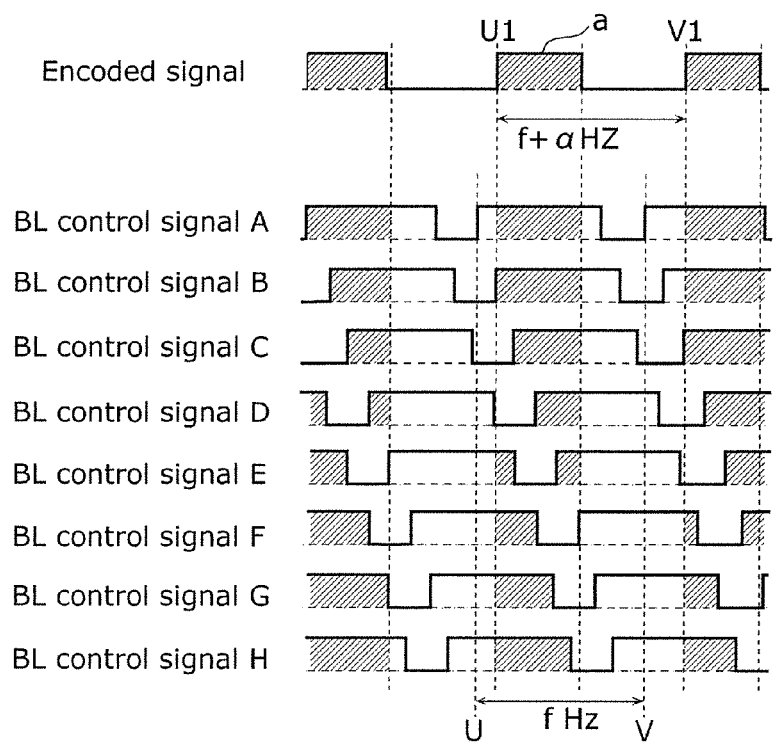
FIG. 18B is a timing chart illustrating operations performed by the second processor according to Embodiment 4.
Figure 18C:
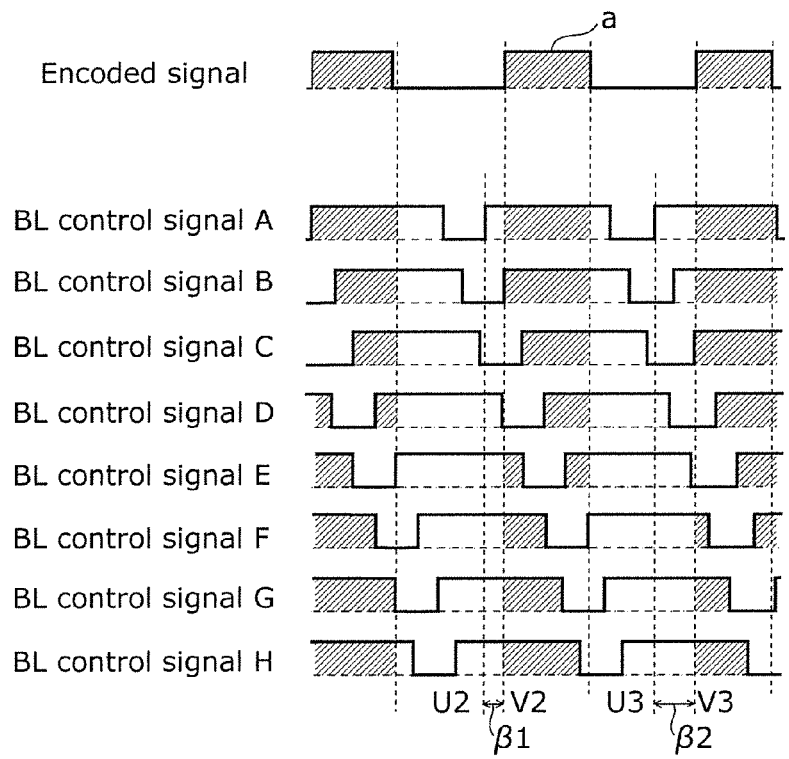
FIG. 18C is a timing chart illustrating operations performed by the second processor according to Embodiment 4.

FIG. 18A, FIG. 18B, and FIG. 18C are timing charts illustrating operations performed by the second processor according to Embodiment 4. The shaded (hatched) portions indicate regions where encoded signals are present. FIG. 18A illustrates a timing change for the BL control signals before superimposition of the encoded signals, and FIG. 18B illustrates a timing chart for the BL control signals after superimposition of the encoded signals. FIG. 18C illustrates an example of when the relationship between the phases of the backlight control signal and the visible light communication signal is temporally changed by setting a delay time from the point in time of the rise or fall of the backlight control signal, which is used as a reference for the encoded signal.

For example, as illustrated in FIG. 18A, the synchronization of the encoded signal and the BL control signal is shifted. With this, on the reception side, such as at the smartphone 200, timing at which reception of the encoded signal is possible can be achieved with certainty. Here, the above-described adjustment period may be calculated per phase difference in each frame and established.

Note that, for example, using region A as a reference, the time difference β1 between the rise of the backlight control signal and the start V2 of the visible light communication signal may be set as the delay time in advance and superimposition may be performed, as illustrated in FIG. 18C. Moreover, with regard to the time difference β2 between the rise U2 and the start V3 of the visible light communication signal in the next frame, the same operations may be performed as with β1 or different operations may be performed. Moreover, in the example illustrated in FIG. 18C, β represents a positive numerical value of delay (time), but may represent a negative value (time) as well.

Moreover, a frame where β=0 maybe mixed in. The region to be used as a reference may be any region, and may be selected based on the above described criteria. The reference time is described as being the rise of the backlight control signal, but the reference time may be the fall or any other waveform characteristic. Moreover, other than a characteristic portion of a backlight control signal in a predetermined region, a synchronization signal of the image signal itself may be used as a reference and, alternatively, a signal of the synchronization signal of the image delayed by a certain amount of time may be generated, and that signal may be used as a reference.

Moreover, in Embodiment 4, since the image signal and the encoded signal do not correspond on a one-to-one basis, various encoding data and imaging data may be buffered in advance in memory (not shown in the drawings) in the display device 100 before performing the above processing.

Note that the cycle (one frame length) of the image signal and the cycle on which the encoded signal is superimposed preferably have a least common multiple within one second, and further preferably within 0.5 seconds. Moreover, when these two cycles synchronize, tracking may be performed from the time of synchronization on a cycle equivalent to a least common multiple or an integer multiple, and the minute temporal offset (phase difference) resulting from the margin of error may be corrected.

Moreover, as described above, when the cycle and/or frequency of the image signal and the cycle and/or frequency of the encoded signal have a relationship that changes the temporal phase relationship thereof, even if each cycle does not include a least common multiple within one second, if the rate of change is fast—for example, when the above change that repeats the same phase relationship can be achieved within one second—there is no particular need to control the relationship between the two phases. Regarding the rate of change, a relationship such as the one described hereinafter is preferable, but is merely an example.

(3. Advantageous Effects, Etc.)

As described above, in the display device according to Embodiment 4, the signal processor (the second processor 170) temporally changes a delay time of encoding the visible light communication signals (encoded signals) on the backlight control signals corresponding to the regions, based on one backlight control signal corresponding to a given region among the regions.

With this, on the reception side, such as at the smartphone 200, timing at which reception of the encoded signal is possible can be achieved with certainty.

Note that the signal processor (the second processor 170) may superimpose the visible light communication signals (encoded signals) on the backlight control signals on a different cycle than a cycle of the backlight control signals, and in each of the regions a relationship between a phase of the backlight control signal and a phase of the visible light communication signal may change with a change in frames.

Here, the cycle of the backlight control signals and the different cycle on which the visible light communication signals are superimposed may change temporally.

Moreover, the visible light communication signals to be superimposed on the backlight control signals may be in phase with one another across all regions in which the visible light communication signals are superimposed.

Moreover, a phase-shift cycle of the visible light communication signals superimposed on the backlight control signals corresponding to the regions and a cycle of one frame of the backlight control signals may have a least common multiple within one second, inclusive.

With this, on the reception side, such as at the smartphone 200, timing at which reception of the encoded signal is possible can be achieved with certainty in a relatively short period of time.

Moreover, the signal processor (the second processor 170) may correct a start of a phase-shift cycle of the visible light communication signals (encoded signals) superimposed on the backlight control signals corresponding to the regions to a cycle of one frame of the backlight control signals on a cycle equivalent to a least common multiple or an integer multiple of the phase-shift cycle of the visible light communication signals (encoded signals) superimposed on the backlight control signals corresponding to the regions and the cycle of one frame of the backlight control signals.

With this, by correcting the phase shift, on the reception side, such as at the smartphone 200, timing at which reception of the encoded signal is possible can be kept from happening over a long period of time.

Here, assuming that the positional relationship and environment allows for reception of communication signals, so long as the time indicating the least common multiple of the above described two types of cycles is a value (time) sufficient for reception to be performed, the time must be no longer than a person trying to receive the data with the receiver is willing to hold the receiver and wait to receive the data. With typical NFC, for example, the amount of time a person is willing to hold the receiver and wait can be one second, and thus one second or less is preferable. Furthermore, as an amount of time that strain the psyche, 0.5 seconds can be used as a further preferable amount of time within which the least common multiple is included.

Embodiment 5

In Embodiments 1 through 4, cases in which each area is sequentially controlled at a normal scanning speed when displaying an image signal, but each area may be sequentially controlled at a sped-up speed scanning speed faster than the normal scanning speed when displaying an image signal.

In Embodiment 5, a case in which each area is sequentially controlled when a 2× speed video signal is scanned at 4× scanning speed will be given as an example. Hereinafter, the example will be based on the assumption that the blanking period is 2× speed.

(1. Display Device Operations)

The following description will focus on operations performed by the second processor 170.

Figure 19A:
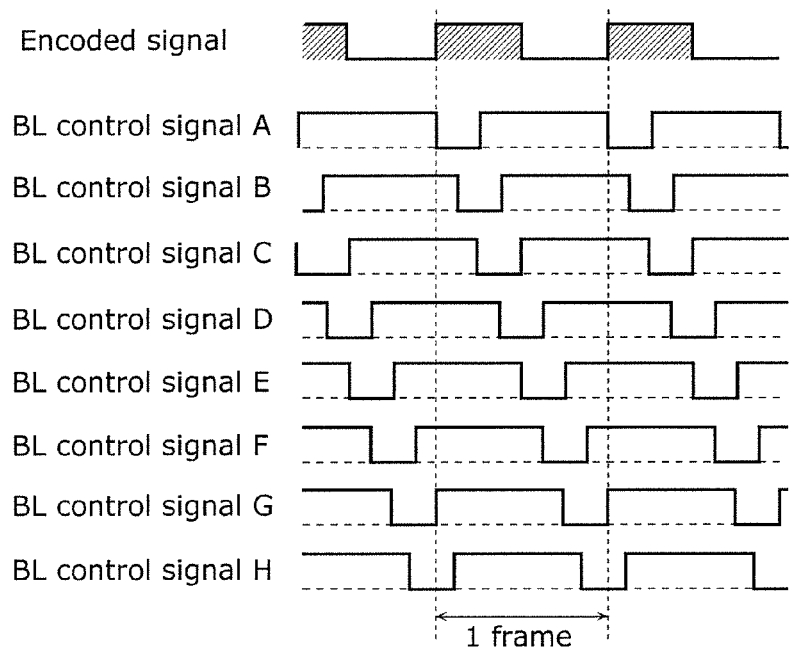
FIG. 19A is a timing chart illustrating operations performed by the second processor according to Embodiment 5.

FIG. 19A and FIG. 19B are timing charts illustrating operations performed by the second processor according to Embodiment 5. The shaded (hatched) portions indicate regions where encoded signals are present. FIG. 19A illustrates a timing chart for the BL control signals before superimposition of the encoded signals, and FIG. 19B illustrates a timing chart for the BL control signals after superimposition of the encoded signals.

For example, as illustrated in FIG. 19A, there are no periods across BL control signal A through BL control signal H in which the backlight is turned on at the same time. In other words, this indicates that the encoded signals cannot be superimposed for all regions of the display region at the same time.

Thus, in Embodiment 5, for example, the scanning period for the blanking periods between regions may be set to half the normal amount, as illustrated in FIG. 19B. Then, the region whose BL control signal blanking period has the latest start time among a plurality of regions (among all regions is also acceptable)—region H—is selected.

The second processor 170 superimposes the encoded signal on the selected region H in synchronization with the timing of the end of the blanking period for region H and the start of the turning on of the backlight 190 (i.e., the point in time at which the BL control signal H turns "ON").

In the example illustrated in FIG. 19B, the second processor 170 superimposes the encoded signals on all regions in the display region in synchronization with the timing of the end of the blanking period for the BL control signal H and the time at which the BL control signal H turns "ON".

As a result, the second processor 170 can set the period for superimposing the encoded signal for any region in the display region to a period that is at most one half of a frame.

(2. Advantageous Effects, Etc.)

As described above, in the display device according to Embodiment 5, the display controller (first controller 140) causes the display panel (150) to display an image on the display screen of the display panel in accordance with a sped-up scanning speed faster than a scanning speed indicated by the image signal.

With this, the display device can lengthen the period in which the encoded signals can be output.

Note that when the encoded signal length (encoded signal period), is long, the encoded signal cannot be superimposed only in the BL control signal ON period (period other than the blanking period), and there is a region that overlaps the blanking period, the encoded signal is not superimposed during the blanking period in that region.

Moreover, an adjustment period for turning on the backlight 190 in the blanking period that is equivalent in length to the ON time from the encoded signal superimposed during the BL control signal ON period may be established. In this case, the adjustment period may be generated using a method described in the above embodiments or the header of the encoded signal may be superimposed in the blanking period. Moreover, the regions of the display region may be divided into groups and the encoded signals may be superimposed.

Moreover, the same processes may be performed in a region above the above-described region (in another region), and no signal may be outputted at all. In this case, using methods described in the above embodiments, an OFF adjustment period may be established to equalize, across the entire screen, duty cycles based on at least one of the visible light communication signals and the image signals. Moreover, similar to Embodiment 3, the brightest region may be selected and encoded signals may be superimposed at timings determined based on that region. Note that in Embodiment 5, the encoded signals are superimposed using the rise of the BL control signals as a reference, but the timing at which the encoded signals are superimposed may be based on other characteristics of the BL control signals such as the fall of the BL control signals, and may be based on a synchronization signal of the image signal itself. Moreover, a signal of the synchronization signal of the image delayed by a certain amount of time may be generated, and that signal may be used as a reference.

Note that in Embodiment 5, an example is given in which the scanning speed is sped from 2x scanning speed to 4x scanning speed, but this is merely an example. The number of frames may be kept the same and only the scanning speed may be increased.

Moreover, in Embodiment 5, this sort of embodiment is achieved in advance and signals are transmitted, but the second processor may use a method in which signals according to Embodiment 5 are transmitted based on the relationship between the image signal and the encoded signal. In this case, in order for the signals to be transmitted from the second processor 170 to the first processor 130 in FIG. 2, the arrow that connects these two blocks may be a two-headed arrow.

Embodiment 6

In Embodiment 1 through 5, the control method in which a period for controlling the turning off of a backlight at a different timing for each of a plurality of regions is exemplified as being applied to backlight scanning, but this is merely an example. This method may be applied to local dimming.

In Embodiment 6, operations performed when the method is applied to local dimming will be described.

Here, local dimming is a backlight control method for reducing power by dividing the display region (screen) into a plurality of regions, increasing the transmittivity of the liquid crystals in the region beyond the normal amount, and decreasing the brightness of the backlight by the corresponding amount (i.e., decreasing the duty cycle). When the transmittivity of the brightest pixel in the region can be increased (when the brightness of the brightest pixel is a relatively low value), it is possible to reduce power consumption with the above method. Moreover, by receding the duty cycle of the backlight, the period during which the backlight is on can be reduced, leading to an increase in contrast.

(1. Backlight Control by Local Dimming)

Next, BL control signals controlled by local dimming will be described.

Figure 20:
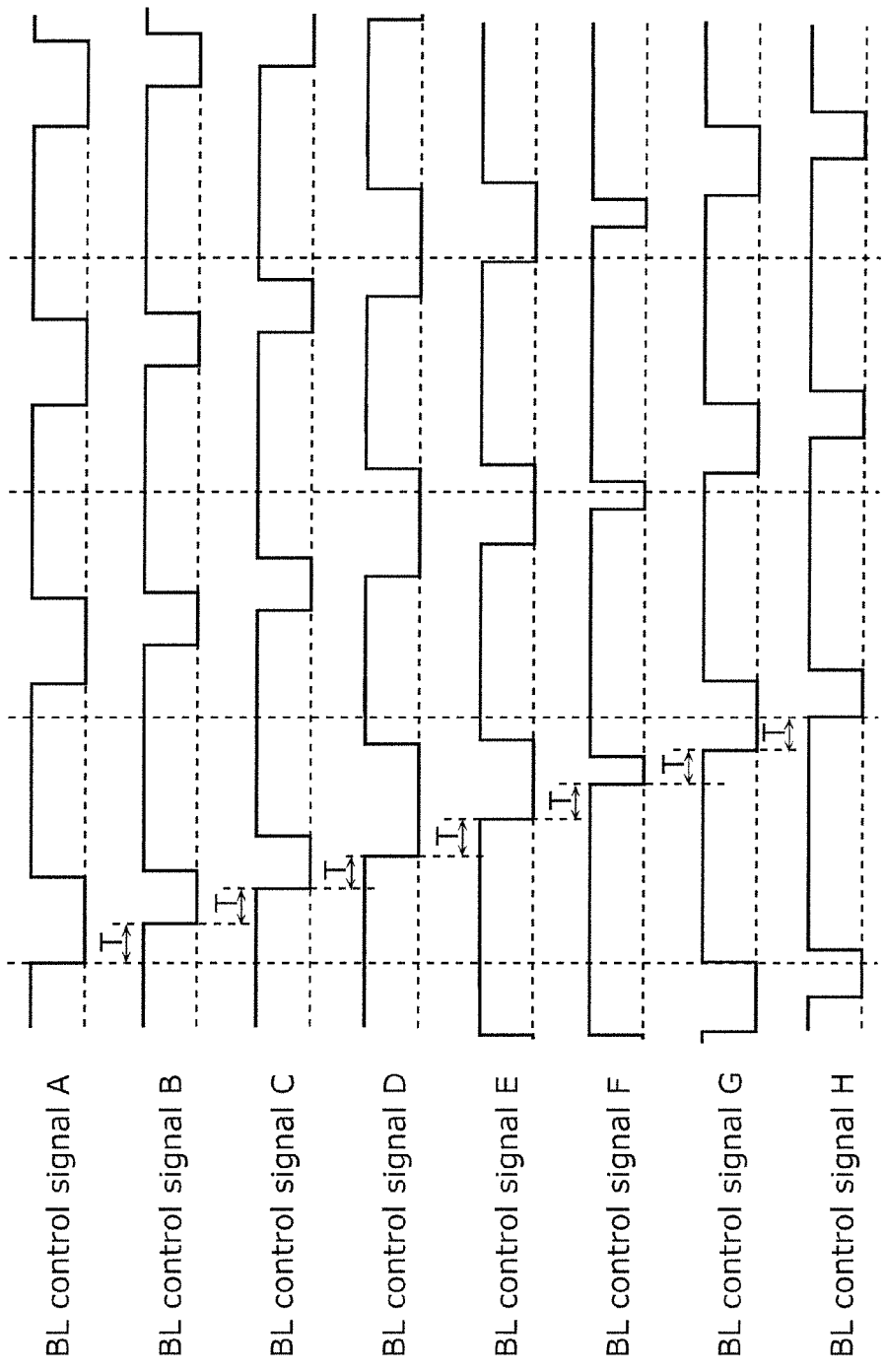
FIG. 20 is a timing chart illustrating backlight control when local dimming is used according to Embodiment 6.

FIG. 20 is a timing chart illustrating backlight control when local dimming is used according to Embodiment 6.

When local dimming is used to control the backlight, for example, in adjacent regions, although the period T between the start of each blanking period is the same throughout, the lengths of the blanking periods are different, as illustrated in FIG. 20.

For this reason, in each of the regions of the display region, the display device 100 according to Embodiment 6 may store the BL control signal blanking period determined based on an image signal previously displayed in memory and perform processing (operations) as follows.

(2. Display Device Operations)

The following description will focus on operations performed by the second processor 170. Note that Embodiment 6 relates to signal control when OFF periods per frame for each region in the display region are aligned.

(2.1. One Example of Operations Performed by Second Processor)

Figure 21:
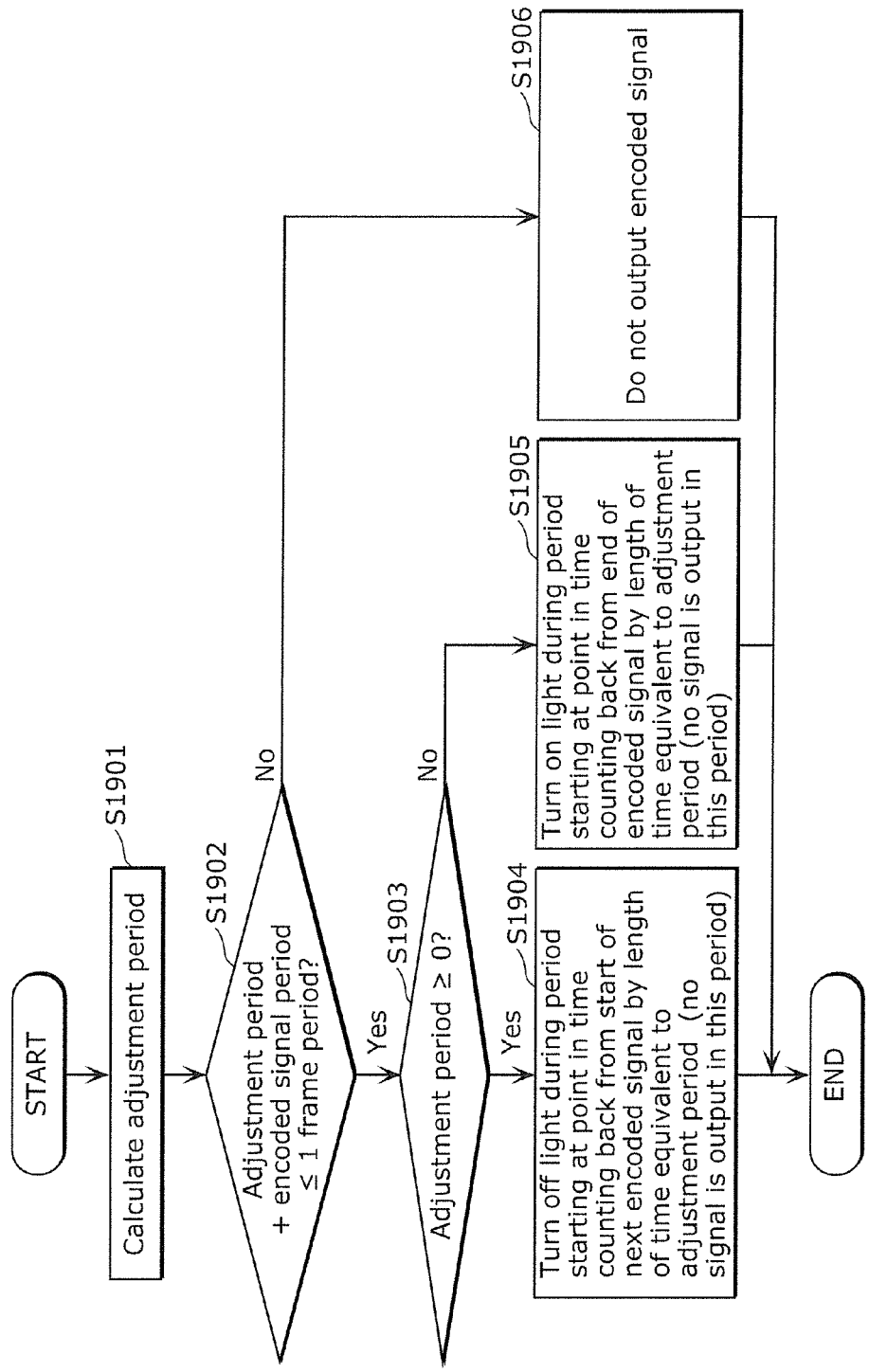
FIG. 21 is a flow chart illustrating an example of operations performed by the second processor according to Embodiment 6.

FIG. 21 is a flow chart illustrating operations performed by the second processor according to Embodiment 6.

First, in step S1901, the second processor 170 calculates the adjustment period. More specifically, when the OFF time in the encoded signal is N1 and the OFF time in the BL control signal input by the first processor is N2, adjustment period N=N2−N1. With this, the second processor 170 can calculate the adjustment period.

Next, in step S1902, the second processor 170 determines whether the sum of adjustment period N and encoded signal period C (i.e., N+C) is less than or equal to one frame period.

When the second processor 170 determines that (N+C) is less than or equal to one frame period (Yes in S1902), the process proceeds to step S1903. When the second processor 170 determines that (N+C) is greater than one frame period (No in S1902), the process proceeds to step S1906, where no encoded signal is output, and processing ends.

Next, in step S1903, the second processor 170 determines whether the adjustment period N is greater than or equal to 0.

When the second processor 170 determines that N is greater than or equal to 0 (Yes in S1903), the process proceeds to S1904, where a OFF period is established from the start of the next encoded signal counting back by a length of time equivalent to the adjustment period. Moreover, the encoded signal is not output in this period, and processing is ended.

When the second processor 170 determines that N is smaller than 0 (No in S1903), the process proceeds to S1905, where an ON period equivalent to the length of the adjustment period is established in the blanking period of the BL control signal, counting back from the end time of the blanking period of the BL control signal. Moreover, the encoded signal is not output in this adjustment period.

Figure 22:
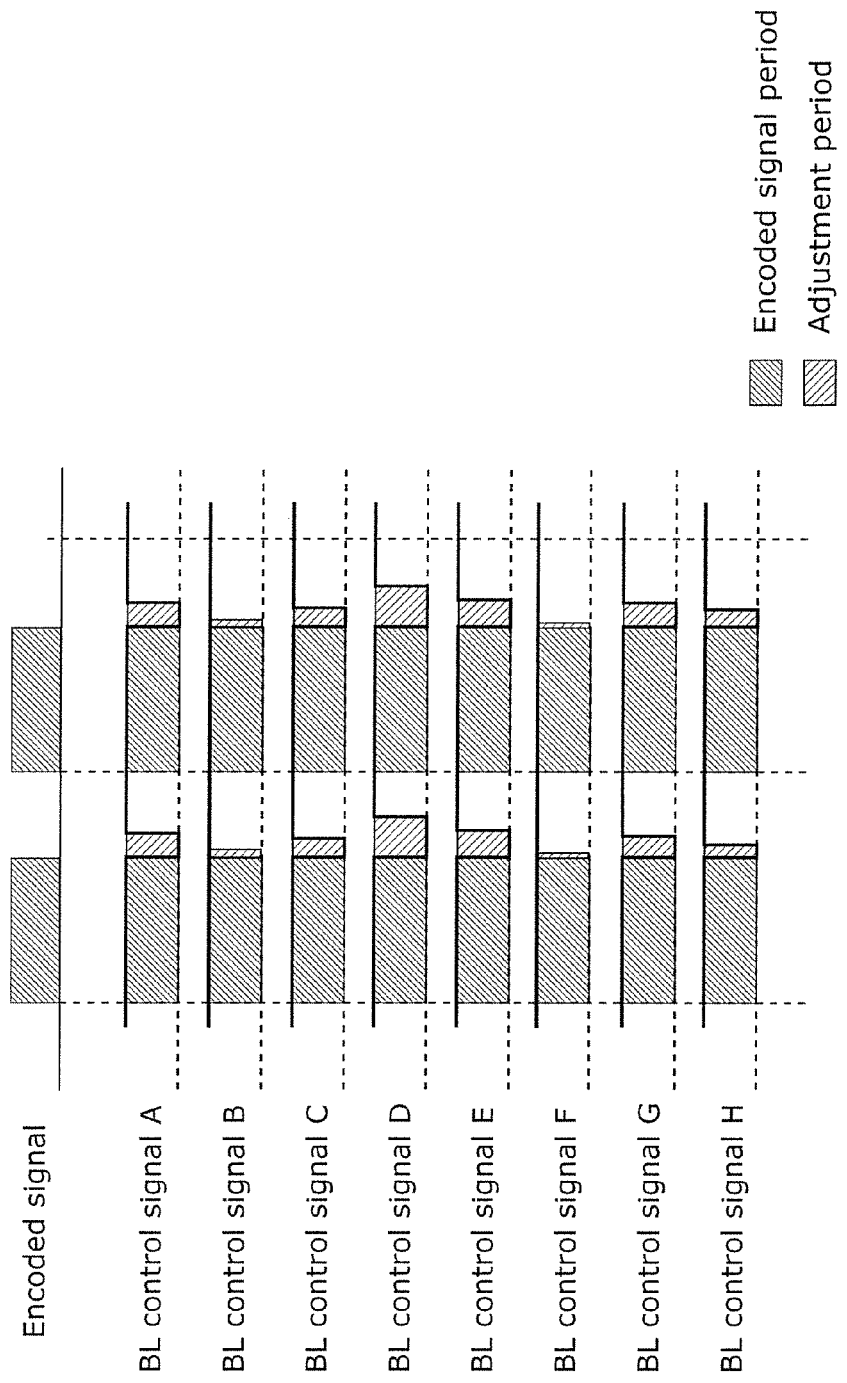
FIG. 22 is a timing chart illustrating an example of operations performed by the second processor according to Embodiment 6.

FIG. 22 is a timing chart illustrating one example of operations performed by the second processor according to Embodiment 6. Here, the bold lines indicate the ON periods and the OFF periods of the BL control signals, and in the following description, region A will be the reference region. Note that the region controlled by BL control signal X (where X is one of A through H) in each figure is also referred to as region X.

For example, as illustrated in FIG. 22, the second processor 170 superimposes in-phase encoded signals on all of the regions at a timing determined based on the start of the frame region A, which is the reference region, and establishes an adjustment period. Note that the adjustment period may be established in accordance with the second method described in Embodiment 1, but since the second method has already been described above, duplication here will be omitted.

In Embodiment 6, in principle, encoded signals are not superimposed during the BL control signal OFF periods (blanking periods), and are superimposed during the BL control signal ON periods, similar to embodiments 1 through 5. Note that the adjustment period may be changed based on the duty cycle of the encoded signal, and in that case, if the adjustment period is a period in which the encoded signal is output, the encoded signal may be superimposed and output.

(2.2. One Example of Operations Performed by Second Processor)

In local dimming as well, provision of a sequential blanking period may be given priority similar to when normal backlight scanning control is performed. Operations performed in this case are described hereinafter.

Figure 23:
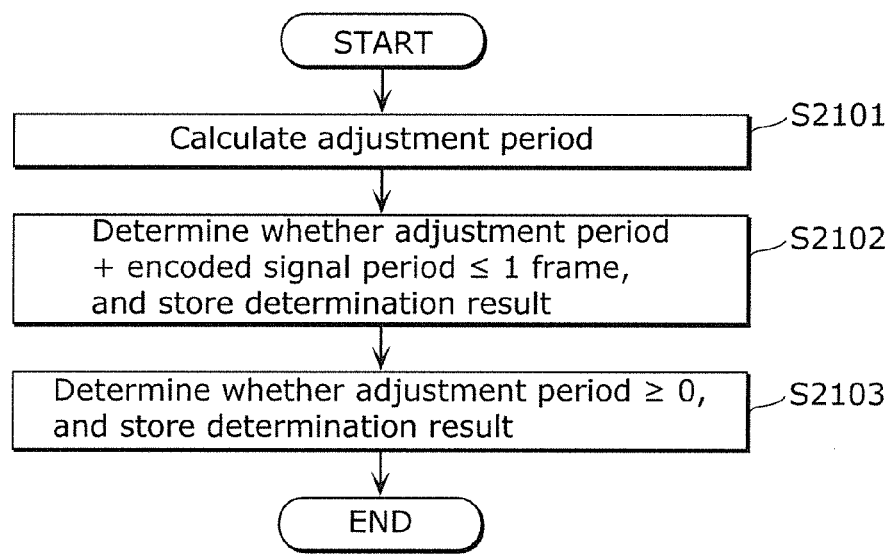
FIG. 23 is a flow chart illustrating an example of operations performed by the second processor according to Embodiment 6.

FIG. 23 is a flow chart illustrating an example of operations performed by the second processor according to Embodiment 6.

First, in step S2101, the second processor 170 calculates the adjustment period. More specifically, when the blanking period in a predetermined region is N1, the OFF time in the encoded signal is N2, and the blanking period for that period is N3, adjustment period N=N1−N2−N3. With this, the second processor 170 can calculate the adjustment period.

Next, in step S2102, the second processor 170 determines whether the sum of adjustment period N, encoded signal period C, and the blanking period N2 of that region (i.e., N+C+N3) is less than or equal to one frame period, and stores the determination result.

Next, in step S2103, the second processor 170 determines whether the adjustment period N is greater than or equal to 0, and stores the determination result.

After completing the above steps, the second processor 170, for example, establishes an adjustment period and displays the visible light communication signal through video, based on the N1 through N3 stored per region and the determination results from steps S2102 and S2103.

Note that the adjustment period may be established based on a combination of the second method described in Embodiment 1 and the methods described in Embodiments 2 through 5, for example.

FIG. 24 is a timing chart illustrating one example of operations performed by the second processor according to Embodiment 6. In FIG. 24, the adjustment period is established based on the second method described in Embodiment 1. Here, the bold lines indicate the ON periods and the OFF periods of the BL control signals, and in the following description, region A will be the reference region.

For example, as illustrated in FIG. 24, the second processor 170 superimposes in-phase encoded signals on all of the regions in a period from time P to time Q starting after a predetermined amount of time has elapsed from the start of the frame region A, which is the reference region, and establishes an adjustment period. Note that the adjustment period may be established in accordance with the second method described in Embodiment 1, but since the second method has already been described above, duplication here will be omitted.

In Embodiment 6, in principle, encoded signals are not superimposed during the BL control signal OFF periods (blanking periods), and are superimposed during the BL control signal ON periods, similar to embodiments 1 through 5. As such, for example, in region A, since a given period starting at time P is a blanking period where the BL control signal A is OFF, the encoded signal is not superimposed. The adjustment period is established after the encoded signal period C.

Note that the adjustment period may be changed based on the duty cycle of the encoded signal, and in that case, if the adjustment period is a period in which the encoded signal is output, the encoded signal may be superimposed and output.

(2.3. One Example of Operations Performed by Second Processor)

FIG. 25 is a timing chart illustrating one example of operations performed by the second processor according to Embodiment 6.

When the backlight is controlled with a local dimming method, the blanking period of the BL control signal is typically different for each frame and each region. As such, to expedite calculations, a temporary blanking period (hereinafter also referred to as a provisional blanking period) is established. The adjustment period can then be calculated in accordance with the second method described in Embodiment 2 based on the provisional blanking period, the encoded signal period, the phase difference between the two, and the original blanking period. Hereinafter, an example when this is the case is described with reference to FIG. 25. The bold line in FIG. 25 indicates the waveform of the original blanking period.

The provisional blanking period is established based on the average length of the blanking periods on the screen, or the shortest period. Here, the provisional blanking period is exemplified as an OFF period during which the encoded signal is not superimposed. The encoded signal period is a period during which the encoded signal is superimposed.

Moreover, the adjustment period may be established using the second method described in Embodiment 1. If the adjustment period is positive, the BL control signal may be adjusted such that the backlight 190 is turned off during this period, and if the adjustment period is negative, the BL control signal may be adjusted such that the backlight 190 is turned on during this period. When the adjustment period is established counting back from the blanking period, the BL control signal may be adjusted such that the backlight 190 is also turned on during the blanking period. Note that when the adjustment period is negative, if the encoded signal is superimposed on the BL control signal in the adjustment period, the adjustment period may be corrected based on the duty cycle.

(3. Advantageous Effects, Etc.)

As described above, in the display device according to Embodiment 6, the backlight controller (the second controller 180) establishes a period during which control of light emission in each of the regions and control for turning off each of the regions a different time in accordance with a light emission amount of the backlight based on each of image signals, each of which is the image signal, are performed based on the backlight control signals outputted by the signal processor (the second processor 170), and changes a duty of the backlight, the duty being based on the image signals and the visible light communication signals.

Note that in Embodiment 3, the encoded signals are superimposed using the rise of the BL control signals as a reference, but the timing at which the encoded signals are superimposed may be based on other characteristics of the BL control signals such as the fall of the BL control signals, and may be based on a synchronization signal of the image signal itself. Moreover, a signal of the synchronization signal of the image delayed by a certain amount of time may be generated, and that signal may be used as a reference.

Although the above embodiment describes a case where local dimming is applied, since local dimming also includes a case in which the regions are two-dimensionally divided and the image signals are scanned and written concurrently in a given direction, there are combinations are regions whose blanking periods are different but in-phase, but the techniques described in Embodiment 6 can be applied in this case as well.

As described above, the non-limiting embodiment has been described by way of example of techniques of the present disclosure. To this extent, the accompanying drawings and detailed description are provided.

Thus, the components set forth in the accompanying drawings and detailed description include not only components essential to solve the problems but also components unnecessary to solve the problems for the purpose of illustrating the above non-limiting embodiments. Thus, those unnecessary components should not be deemed essential due to the mere fact that they are described in the accompanying drawings and the detailed description.

The above non-limiting embodiment illustrates techniques of the present disclosure, and thus various modifications, permutations, additions and omissions are possible in the scope of the appended claims and the equivalents thereof.

For example, in the above embodiments, the encoded signals are described as being superimposed using the rise of the BL control signals as a reference, but this is merely an example. For example, the timing at which the encoded signals are superimposed may be based on a characteristic timing of the BL control signal, and may be based on a synchronization signal of the image signal itself. Moreover, a signal of the synchronization signal of the image delayed by a certain amount of time may be generated, and that signal may be used as a reference.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present disclosure is applicable to a display device capable of outputting visible light communication signals without significantly deteriorating the quality of the display image, and capable of reducing receiving error of output visible light communication signals, and a method for controlling such a display device. More specifically, the display device according to the present disclosure is applicable to a wide variety of applications relating to the forwarding and transmission of all sorts of information accompanying images, such as outdoor signage, information devices, information display devices since they can actively and securely obtain necessary information as needed, in addition to household devices such as televisions, personal computers and tablets since they can actively and securely obtain information other than images.

The invention claimed is:

1. A display device that outputs visible light communication signals, the display device comprising:
   a display panel including a display screen on which an image is displayed;
   a display controller that causes the display panel to display an image on the display screen of the display panel based on an image signal;
   a backlight having a light emission surface that illuminates the display screen of the display panel from behind;
   a signal processor that superimposes the visible light communication signals on backlight control signals generated based on the image signal; and
   a backlight controller that (i) divides the light emission surface of the backlight into regions respectively corresponding to the backlight control signals and (ii) establishes a period during which control of light emission in each of the regions and control for turning off the backlight in each of the regions a different time are performed based on the backlight control signals outputted by the signal processor,
   wherein when superimposing the visible light communication signals on the backlight control signals, the signal processor does not superimpose a visible light communication signal in a period indicating an OFF state of the backlight in the backlight control signals,
   the signal processor superimposes the visible light communication signals in a one-to-one manner on the backlight control signals respectively corresponding to the regions such that in each of the regions, the backlight control signal and the superimposed visible light communication signal imposed on the backlight control signal are in phase with one another, and
   when superimposing the visible light communication signals on the backlight control signals, if the regions include a region corresponding to a backlight control signal having an overlapping period in which (i) the backlight control signal having the overlapping period indicates an OFF state of the backlight and (ii) a visible light communication signal has not been superimposed on the backlight control signal,
      the signal processor establishes a ON adjustment period for the region with the overlapping period and adjusts ON/OFF of the backlight control signal during the ON adjustment period, the ON adjustment period being for adjusting brightness of the region with overlapping periods.

2. The display device according to claim 1, wherein based on the backlight control signal corresponding to a predetermined region among the regions, the signal processor matches phases of the visible light communication signals superimposed on the backlight control signals corresponding to the regions.

3. The display device according to claim 2, wherein the predetermined region is a brightest region among the regions.

4. The display device according to claim 2, wherein the predetermined region is a region corresponding to an edge portion of the display screen among the regions.

5. The display device according to claim 1, wherein the signal processor encodes the visible light communication signals to generate encoded signals and superimposes the encoded signals, as the visible light communication signals, on the backlight control signals, and
when superimposing the encoded signals on the backlight control signals, if the regions include a region whose backlight control signal indicates an OFF state of the backlight in a period that overlaps a period of the encoded signal being superimposed,
a header portion of the encoded signal is superimposed on the backlight control signal during the period indicating an OFF state of the backlight, and a portion of the encoded signal other than the header portion is superimposed on the backlight control signal during a period other than the period indicating an OFF state of the backlight.

6. The display device according to claim 1, wherein the signal processor superimposes the visible light communication signals on the backlight control signals on a different cycle than a cycle of the backlight control signals, and in each of the regions a relationship between a phase of the backlight control signal and a phase of the visible light communication signal changes with a change in frames.

7. The display device according to claim 6, wherein the cycle of the backlight control signals and the different cycle on which the visible light communication signals are superimposed change temporally.

8. The display device according to claim 6, wherein the visible light communication signals to be superimposed on the backlight control signals are in phase with one another across all regions in which the visible light communication signals are superimposed.

9. The display device according to claim 6, wherein a phase-shift cycle of the visible light communication signals superimposed on the backlight control signals corresponding to the regions and a cycle of one frame of the backlight control signals have a least common multiple within one second, inclusive.

10. The display device according to claim 6, wherein the signal processor corrects a start of a phase-shift cycle of the visible light communication signals superimposed on the backlight control signals corresponding to the regions to a cycle of one frame of the backlight control signals on a cycle equivalent to a least common multiple or an integer multiple of the phase-shift cycle of the visible light communication signals superimposed on the backlight control signals corresponding to the regions and the cycle of one frame of the backlight control signals.

11. The display device according to claim 1, wherein the signal processor temporally changes a delay time of encoding the visible light communication signals on the backlight control signals corresponding to the regions, based on one backlight control signal corresponding to a given region among the regions.

12. The display device according to claim 1, wherein the display controller causes the display panel to display an image on the display screen of the display panel in accordance with a sped-up scanning speed faster than a scanning speed indicated by the image signal.

13. The display device according to claim 1, wherein the backlight controller establishes a period during which control of light emission in each of the regions and control for turning off each of the regions a different time in accordance with a light emission amount of the backlight based on each of image signals, each of which is the image signal, are performed based on the backlight control signals outputted by the signal processor, and changes a duty of the backlight, the duty being based on the image signals and the visible light communication signals.

14. A method of controlling a display device that outputs visible light communication signals, the display device including:
   a display panel including a display screen that displays an image; and
   a backlight having a light emission surface that illuminates the display screen of the display panel from behind, and
   the method comprising:
      causing the display panel to display an image on the display screen of the display panel based on an image signal;
      superimposing the visible light communication signals on backlight control signals generated based on the image signal;
      dividing the light emission surface of the backlight into regions respectively corresponding to the backlight control signals; and
      establishing a period during which control of light emission in each of the regions and control for turning off the backlight in each of the regions a different time are performed based on the backlight control signals outputted by the signal processor,
   wherein when superimposing the visible light communication signals on the backlight control signals, a visible light communication signal is not superimposed in a period indicating an OFF state of the backlight in the backlight control signals,
   the visible light communication signals are superimposed in a one-to-one manner on the backlight control signals respectively corresponding to the regions such that in each of the regions, the backlight control signal and the superimposed visible light communication signal imposed on the backlight control signal are in phase with one another, and
   when superimposing the visible light communication signals on the backlight control signals, if the regions include a region corresponding to a backlight control signal having an overlapping period in which (i) the backlight control signal having the overlapping period indicates an OFF state of the backlight and (ii) a visible light communication signal has not been superimposed on the backlight control signal,
      the signal processor establishes a ON adjustment period for the region with the overlapping period and adjusts ON/OFF of the backlight control signal during the ON adjustment period, the ON adjustment period being for adjusting brightness of the region with overlapping periods.

* * * * *